US012671550B2

(12) United States Patent
Venugopal et al.

(10) Patent No.: US 12,671,550 B2
(45) Date of Patent: Jun. 30, 2026

(54) OVERHEAD REDUCTION FOR COHERENT JOINT TRANSMISSION (CJT) CHANNEL STATE INFORMATION (CSI) FEEDBACK

(71) Applicant: QUALCOMM Incorporated, San Diego, CA (US)

(72) Inventors: Kiran Venugopal, Green Brook, NJ (US); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 388 days.

(21) Appl. No.: 18/306,377

(22) Filed: Apr. 25, 2023

(65) Prior Publication Data

US 2024/0364472 A1 Oct. 31, 2024

(51) Int. Cl.
*H04L 5/00* (2006.01)
*H04B 7/06* (2006.01)
(52) U.S. Cl.
CPC ......... *H04L 5/0051* (2013.01); *H04B 7/0626* (2013.01); *H04L 5/0035* (2013.01)
(58) Field of Classification Search
CPC ..... H04L 5/0051; H04L 5/0035; H04L 5/005; H04L 5/0053; H04L 5/0057; H04B 7/0626; H04B 7/0417; H04B 7/063; H04B 7/024
See application file for complete search history.

(56) References Cited

U.S. PATENT DOCUMENTS

| | | | | |
|---|---|---|---|---|
| 2013/0258874 A1* | 10/2013 | Khoshnevis | .......... | H04L 1/0027 370/252 |
| 2015/0131604 A1* | 5/2015 | Hammarwall | ........ | H04W 72/04 370/330 |
| 2021/0328644 A1* | 10/2021 | Hao | ..................... | H04B 7/0639 |
| 2023/0088818 A1* | 3/2023 | Chou | .................. | H04B 7/0469 370/329 |
| 2023/0370141 A1* | 11/2023 | Hindy | ................. | H04B 7/0639 |

OTHER PUBLICATIONS

Gaal P., et al., (Qualcomm Incorporated): "CSI enhancements for medium UE velocities and Coherent-JT", R1-2212101, Type Discussion, NR_MIMO_EVO_DL_UL-CORE, 3rd Generation Partnership Project, Mobile Competence Centre, 650, Route Des Lucioles, F-06921, Sophia-Antipolis Cedex, France, vol. 3GPP RAN 1, No. Toulouse, FR, Nov. 14, 2022-Nov. 18, 2022, Nov. 5, 2022, 21 Pages, XP052222665, section 3.
International Search Report and Written Opinion—PCT/US2024/025360—ISA/EPO—Jul. 30, 2024.
Lenovo: "CSI enhancements for high mobility and coherent JT", R1-2206211, 3rd Generation Partnership Project, Mobile Competence Centre, 650, Route Des Lucioles, F-06921 Sophia-antipolis Cedex, France, vol. RAN WG1, No. Toulouse, Aug. 22, 2022-Aug. 26 2022, Aug. 12, 2022, 20 Pages, XP052274146, section 3.

* cited by examiner

*Primary Examiner* — Rina C Pancholi
(74) *Attorney, Agent, or Firm* — QUALCOMM Incorporated

(57) ABSTRACT

Certain aspects of the present disclosure provide a method for wireless communications at a user equipment (UE). The UE may receive grouping information indicating at least one group of channel state information (CSI) reference signal (RS) resources from a set of CSI-RS resources. The UE may further transmit a CSI report indicating a CSI feedback for the at least one group of CSI-RS resources. The CSI feedback indicates relative phase information for the at least one group of CSI-RS resources with respect to a reference CSI-RS resource.

28 Claims, 28 Drawing Sheets

2100

A method for wireless communications by a user equipment (UE), including

2110

Receiving grouping information indicating at least one group of channel state information (CSI) reference signal (RS) resources from a set of CSI-RS resources

2120

Transmitting a CSI report indicating a CSI feedback for the at least one group of CSI-RS resources where the CSI feedback indicates relative phase information for the at least one group of CSI-RS resources with respect to a reference CSI-RS resource

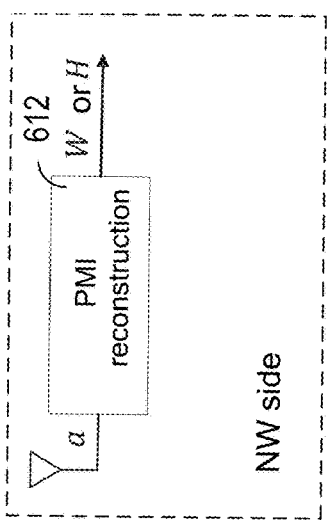
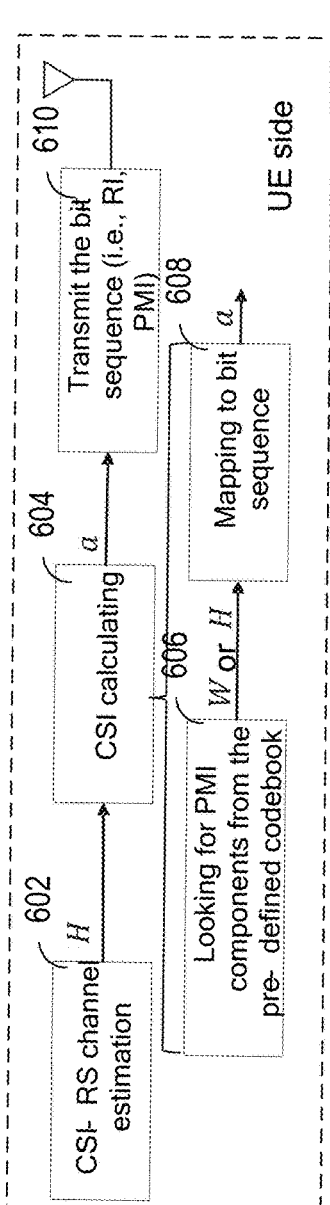
*FIG. 6*

Scenario 1: Co-located TRPs/panels (intra-site)

Scenario 2: Distributed TRPs (inter-site)

1A: With same orientation (assumption of Rel-15 Type-I multi-panel)

1B: With different orientations (inter-sector)

700 →

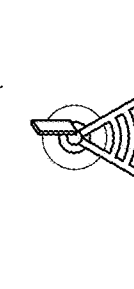

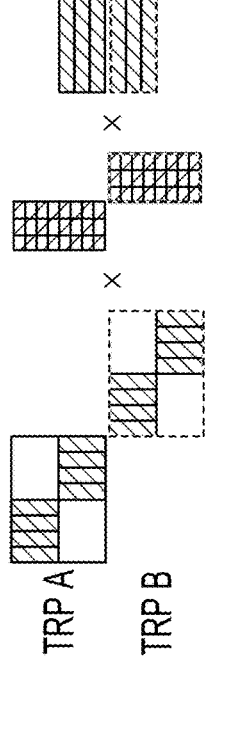

| Joint SD&FD | Joint FD, separate SD | Separate SD&FD with co-phase/-amplitude |
|---|---|---|

$$\begin{bmatrix} W^{TRP\#A} \\ W^{TRP\#B} \end{bmatrix}$$

$$= \begin{bmatrix} W_1 & 0 \\ 0 & W_1 \end{bmatrix} \times \tilde{W}_2 \times W_f^H$$

$$\begin{bmatrix} W^{TRP\#A} \\ W^{TRP\#B} \end{bmatrix}$$

$$= \begin{bmatrix} W_{1,A} & 0 \\ 0 & W_{1,B} \end{bmatrix} \times \tilde{W}_2 \times W_f^H$$

$$\begin{bmatrix} W^{TRP\#A} \\ qW^{TRP\#B} \end{bmatrix} = \begin{bmatrix} W_{1,A} \times \tilde{W}_{2,A} \times W_{f,A}^H \\ W_{1,B} \times q\tilde{W}_{2,B} \times W_{f,B}^H \end{bmatrix}$$

$$= \begin{bmatrix} W_{1,A} & 0 \\ 0 & W_{1,B} \end{bmatrix} \times \begin{bmatrix} \tilde{W}_{2,A} & 0 \\ 0 & q\tilde{W}_{2,B} \end{bmatrix} \times \begin{bmatrix} W_{f,A}^H \\ W_{f,B}^H \end{bmatrix}$$

TRP A

TRP B

TRP A

TRP B (Joint-FD codebook)

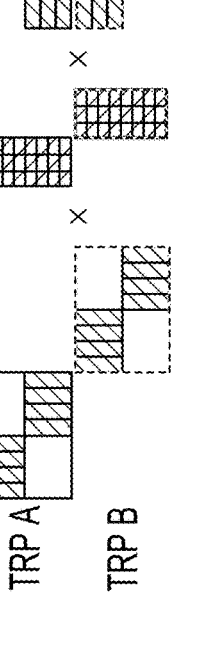

(Semi-)separate-FD codebook)

Layer 0

Layer 1

Layer 2

Layer 3

Select $M_4$ basis

Select $M_4$ basis

Select $M_4$ basis

Select $M_4$ basis

900
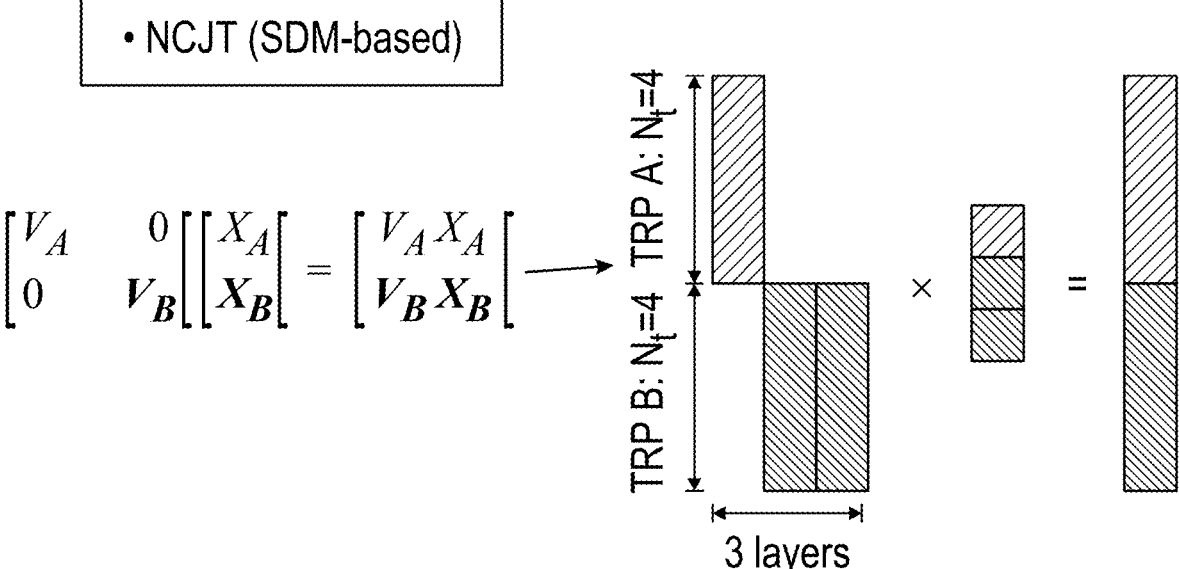
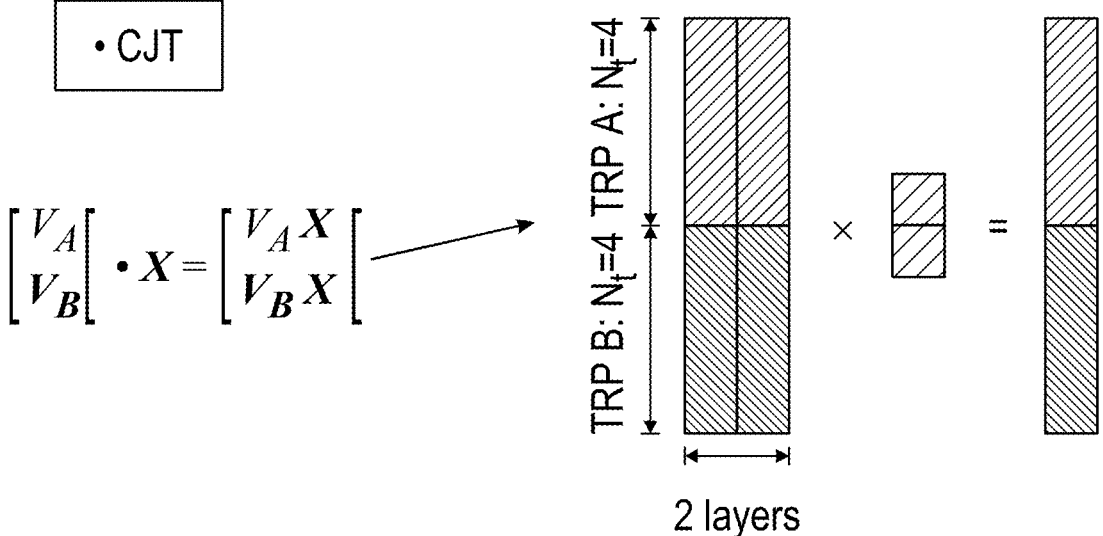
*FIG. 9*

1000
NCJT
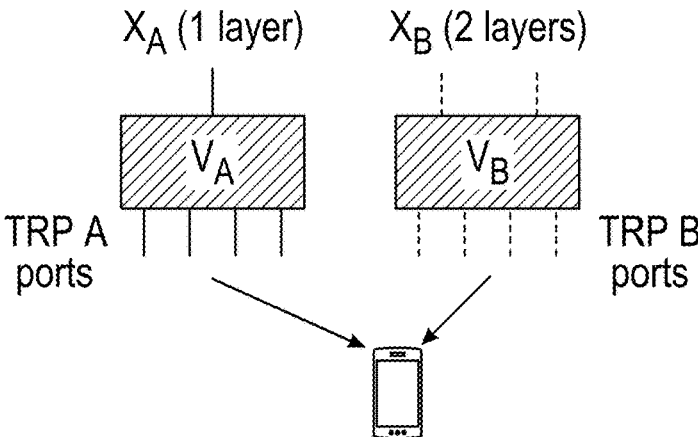
CJT -
option 1
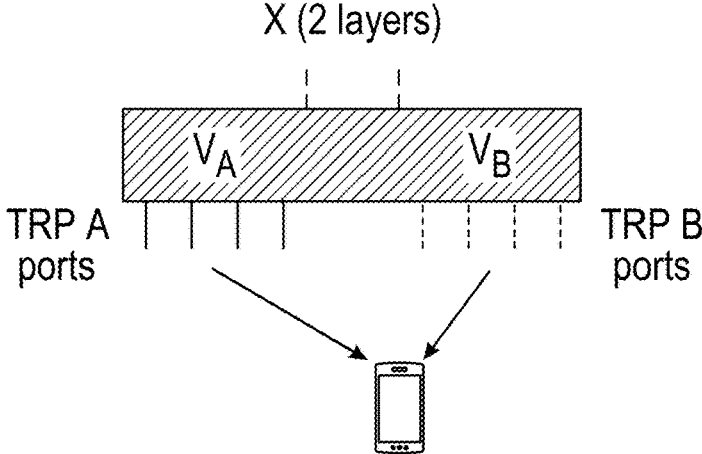
CJT -
option 2
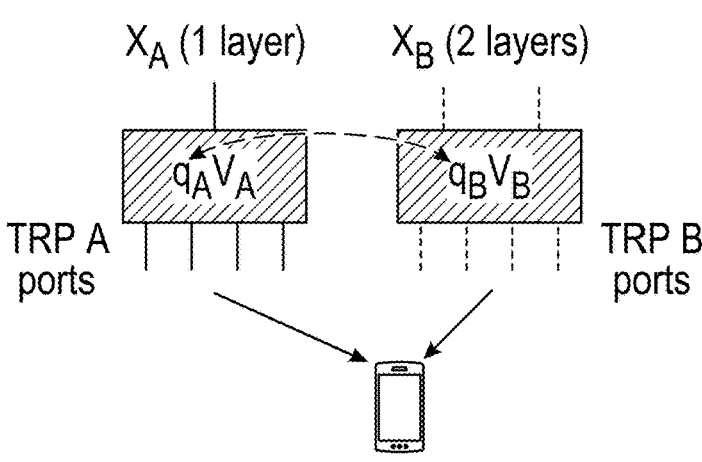
*FIG. 10*

| Bit $b_2^{(k2(N_1x_2+x_1)+1),(k2(N_1x_2+x_1))}$ | Maximum Average Coefficient Amplitude $\gamma_{l+pL}$ |
|---|---|
| 00 | 0 |
| 01 | $\sqrt{1/4}$ |
| 10 | $\sqrt{1/2}$ |
| 11 | 1 |

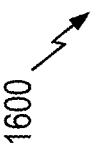
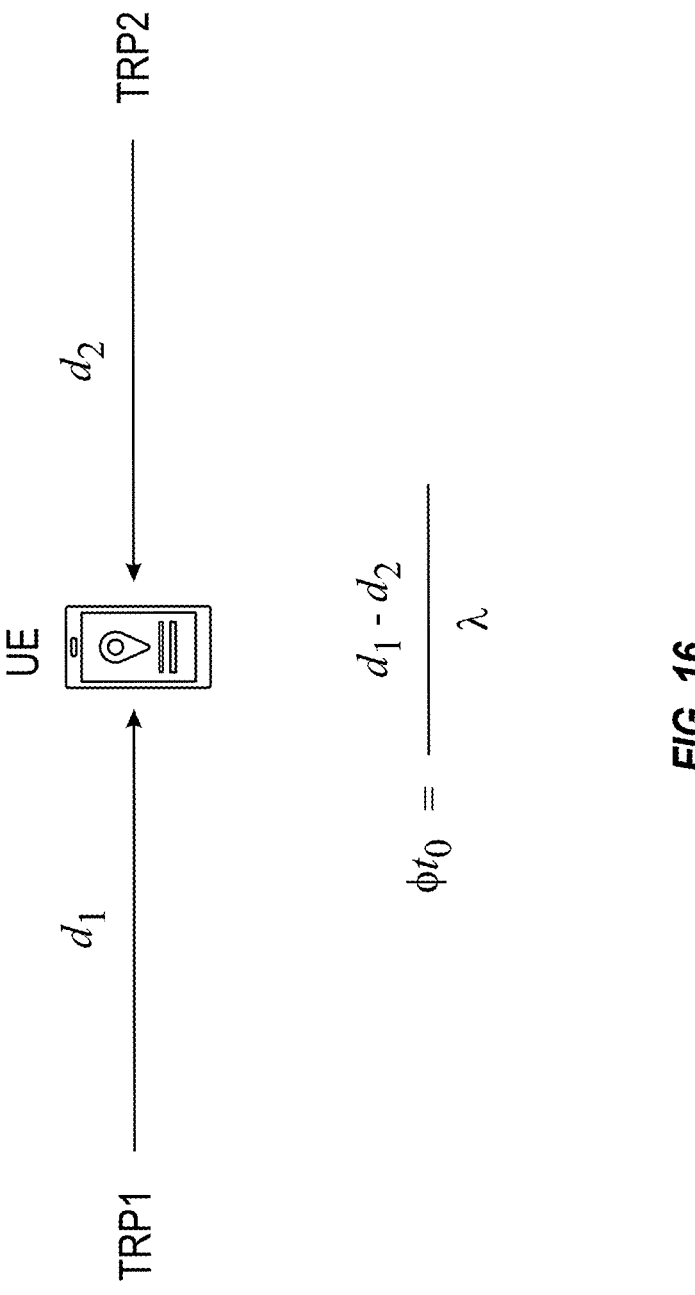
$$\phi t_0 = \frac{d_1 - d_2}{\lambda}$$
*FIG. 16*

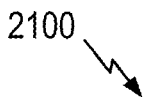

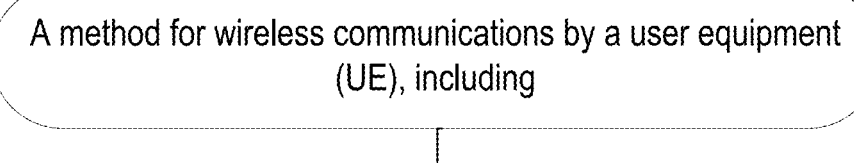

A method for wireless communications by a user equipment (UE), including

2110

Receiving grouping information indicating at least one group of channel state information (CSI) reference signal (RS) resources from a set of CSI-RS resources

2120

Transmitting a CSI report indicating a CSI feedback for the at least one group of CSI-RS resources where the CSI feedback indicates relative phase information for the at least one group of CSI-RS resources with respect to a reference CSI-RS resource

*FIG. 21*

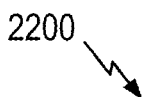

2200

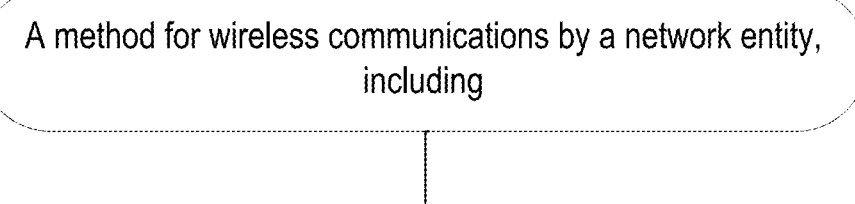

A method for wireless communications by a network entity, including

2210

Transmitting grouping information indicating at least one group of channel state information (CSI) reference signal (RS) resources from a set of CSI-RS resources

2220

Receiving a CSI report indicating a CSI feedback for the at least one group of CSI-RS resources where the CSI feedback indicates relative phase information for the at least one group of CSI-RS resources with respect to a reference CSI-RS resource

FIG. 22

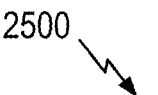

2500

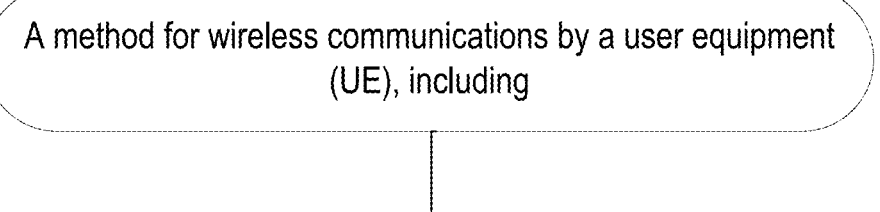

A method for wireless communications by a user equipment (UE), including

2510

Receiving grouping information indicating one or more groups of channel state information (CSI) reference signal (RS) resources within a set of CSI-RS resources

2520

Transmitting a report indicating at least one of: co-phase information or co-amplitude information for each of the one or more groups of CSI-RS resources

FIG. 25

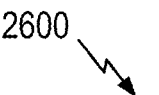

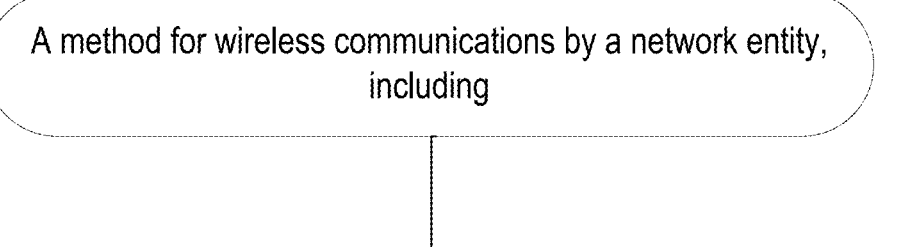

A method for wireless communications by a network entity, including

2610

Transmitting grouping information indicating one or more groups of channel state information (CSI) reference signal (RS) resources within a set of CSI-RS resources

2620

Receiving a report indicating at least one of: co-phase information or co-amplitude information for each of the one or more groups of CSI-RS resources

*FIG. 26*

OVERHEAD REDUCTION FOR COHERENT JOINT TRANSMISSION (CJT) CHANNEL STATE INFORMATION (CSI) FEEDBACK

BACKGROUND

Field of the Disclosure

Aspects of the present disclosure relate to wireless communications, and more particularly, to techniques for managing coherent joint transmission (CJT) channel state information (CSI) feedback.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by a user equipment (UE).—a CSI feedback for the at least one group of CSI-RS resources where the CSI feedback indicates relative phase information for the at least one group of CSI-RS resources with respect to a reference CSI-RS resource.

Another aspect provides a method for wireless communications by a network entity. The method includes transmitting grouping information indicating at least one group of CSI-RS resources from a set of CSI-RS resources, and receiving a CSI report indicating a CSI feedback for the at least one group of CSI-RS resources where the CSI feedback indicates relative phase information for the at least one group of CSI-RS resources with respect to a reference CSI-RS resource.

Another aspect provides a method for wireless communications by a UE. The method includes receiving grouping information indicating one or more groups of CSI-RS resources within a set of CSI-RS resources, and transmitting a report indicating at least one of: co-phase information or co-amplitude information for each of the one or more groups of CSI-RS resources.

Another aspect provides a method for wireless communications by a network entity. The method includes transmitting grouping information indicating one or more groups of CSI-RS resources within a set of CSI-RS resources, and receiving a report indicating at least one of: co-phase information or co-amplitude information for each of the one or more groups of CSI-RS resources.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIG. 6 depicts example codebook (CB) based channel state feedback (CSF).

FIG. 7 depicts example transmitter receiver point (TRP) scenarios for a coherent joint transmission (CJT).

FIG. 9 depicts example spatial division multiplexed (SDM) based non-coherent joint transmission (NCJT) and CJT.

FIG. 10 depicts example CJT and NCJT scenarios.

FIG. 13 depicts example bitmap for a CBSR.

FIG. 16 depicts a first position of a UE with respect to two TRPs.

FIG. 21 depicts a method for wireless communications by a UE.

FIG. 22 depicts a method for wireless communications by a network entity.

FIG. 25 depicts a method for wireless communications by a UE.

FIG. 26 depicts a method for wireless communications by a network entity.

DETAILED DESCRIPTION

Aspects of the present disclosure provide apparatuses, methods, processing systems, and computer-readable mediums for managing coherent joint transmission (CJT) channel state information (CSI) feedback.

In some wireless network deployments, a network entity may be associated with multiple transmission reception points (TRPs), which may simultaneously or concurrently transmit a similar signal over a same frequency channel. In such deployments, a user equipment (UE) may communicate with more than one TRP using coordinated multi point (COMP) operations. The CoMP operations may be based on a CJT process. A CJT may be a COMP transmission in which the signals from the multiple TRPs are received in-phase (e.g., coherently) by the UE.

During the CJT process, the network entity may configure the TRPs to transmit one or more CSI reference signals (RSs) to the UE. The network entity may also be configured to receive a CSI report from the UE. The CSI report indicates one or more precoding matrix indicators (PMIs) based on the one or more CSI-RSs. A PMI indicates relative phase information between the TRPs. The network entity configures the TRPs for the CJT based on the relative phase information.

In some cases, a CSI-RS resource is configured for each TRP. That is, a plurality of CSI-RS resources may be configured for a plurality of TRPs participating in the CJT (e.g., for transmitting a plurality of CSI-RSs). In such cases, the UE may send the CSI report indicating the relative phase information for each CSI-RS resource of the plurality of CSI-RS resources, which may increase overall CSI report signaling overhead.

To reduce the CSI report signaling overhead, techniques presented herein may enable CSI reporting of the relative phase information for one or more subsets of CSI-RS resources of the plurality of CSI-RS resources. For example, the network entity may provide information associated with the one or more subsets of CSI-RS resources to the UE, and the UE may provide the relative phase information for the one or more subsets of CSI-RS resources instead for each CSI-RS resource to the network entity. For example, each subset of CSI-RS resources may be associated with a subset of TRPs that may be located at a same location, that may operate together, or that may share a same radio frequency (RF) chain or a same digital port.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
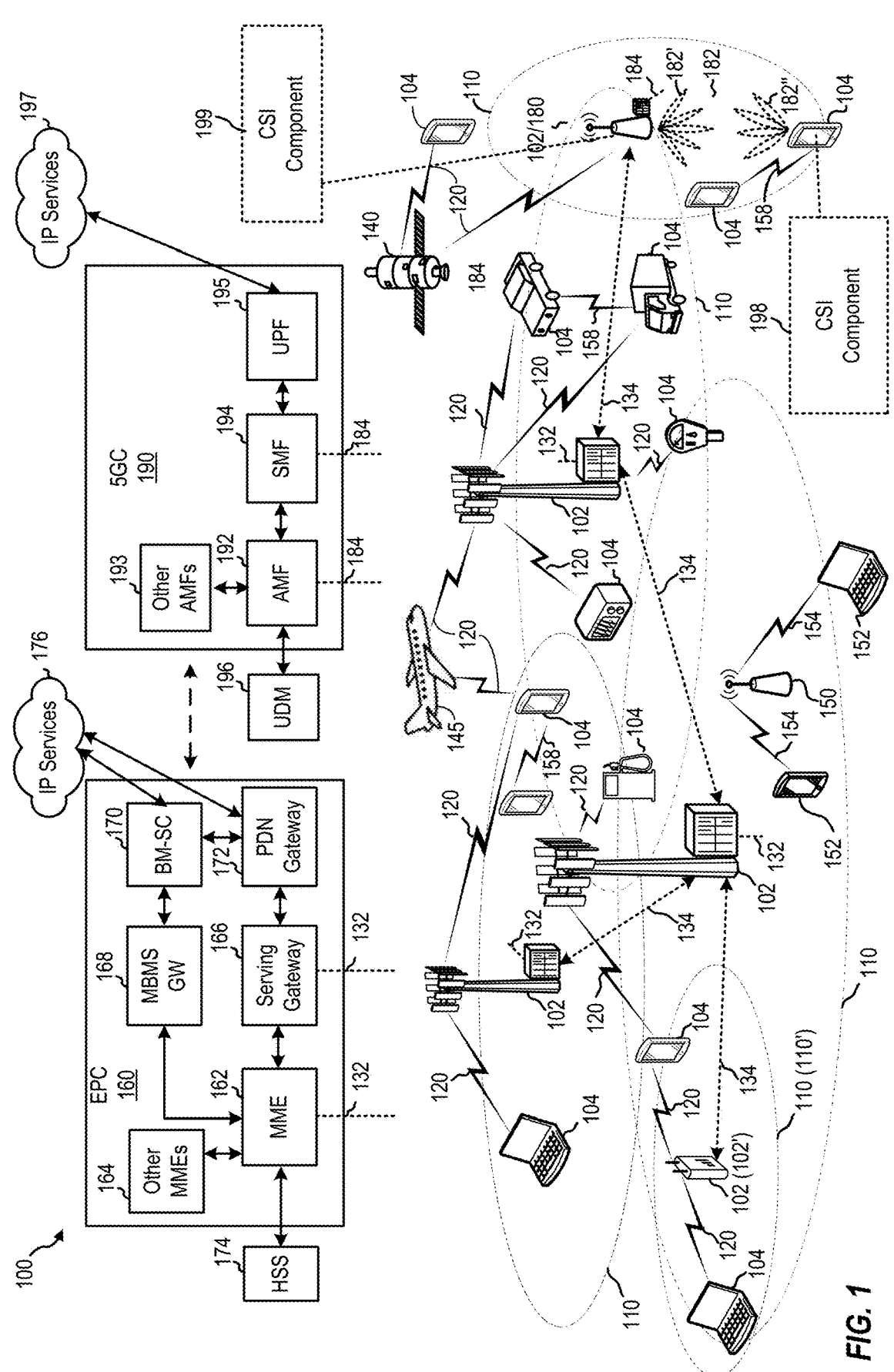
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio BS, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
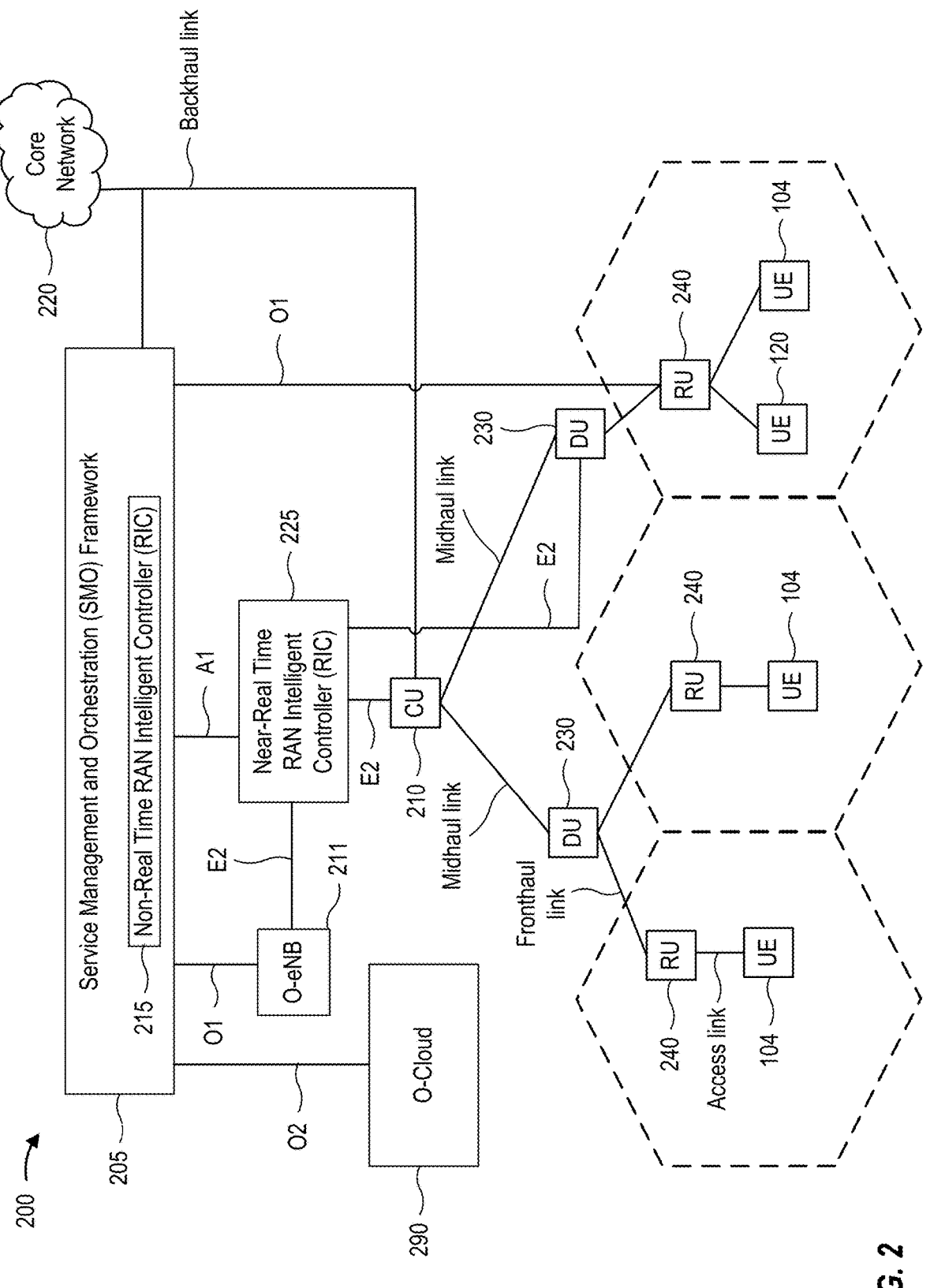
FIG. 2 depicts an example disaggregated base station (BS) architecture.

While BSs 102 are depicted in various aspects as unitary communications devices, BSs 102 may be implemented in various configurations. For example, one or more components of a BS 102 may be disaggregated, including a central unit (CU), one or more distributed units (DUs), one or more radio units (RUS), a Near-Real Time (Near-RT) RAN Intelligent Controller (RIC), or a Non-Real Time (Non-RT) RIC, to name a few examples. In another example, various aspects of a BS 102 may be virtualized. More generally, a BS (e.g., BS 102) may include components that are located at a single physical location or components located at various physical locations. In examples in which a BS 102 includes components that are located at various physical locations, the various components may each perform functions such that, collectively, the various components achieve functionality that is similar to a BS 102 that is located at a single physical location. In some aspects, a BS 102 including components that are located at various physical locations may be referred to as a disaggregated radio access network (RAN) architecture, such as an Open RAN (O-RAN) or Virtualized RAN (VRAN) architecture. FIG. 2 depicts and describes an example disaggregated BS architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHZ-6 GHz, which is often referred to (interchangeably) as "Sub-6 GHz". Similarly, 3GPP currently defines Frequency Range 2 (FR2) as including 26-41 GHz, which is sometimes referred to (interchangeably) as a "millimeter wave" ("mmW" or "mm Wave"). A BS configured to communicate using mm Wave/near mmWave radio frequency bands (e.g., a mmWave BS such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain BSs (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

Wireless communication network 100 further includes channel state information (CSI) component 198, which may be configured to perform method 2100 of FIG. 21 and/or method 2500 of FIG. 25. Wireless communication network 100 further includes CSI component 199, which may be configured to perform method 2200 of FIG. 22 and/or method 2600 of FIG. 26.

In various aspects, a network entity or network node can be implemented as an aggregated BS, as a disaggregated BS, a component of a BS, an integrated access and backhaul (IAB) node, a relay node, a sidelink node, to name a few examples.

FIG. 2 depicts an example disaggregated BS 200 architecture. The disaggregated BS 200 architecture may include one or more central units (CUs) 210 that can communicate directly with a core network 220 via a backhaul link, or indirectly with the core network 220 through one or more disaggregated BS units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more BS functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUS 240 and Near-RT RICs 225. In some implementations, the SMO Framework 205 can communicate with a hardware aspect of a 4G RAN, such as an open eNB (O-cNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
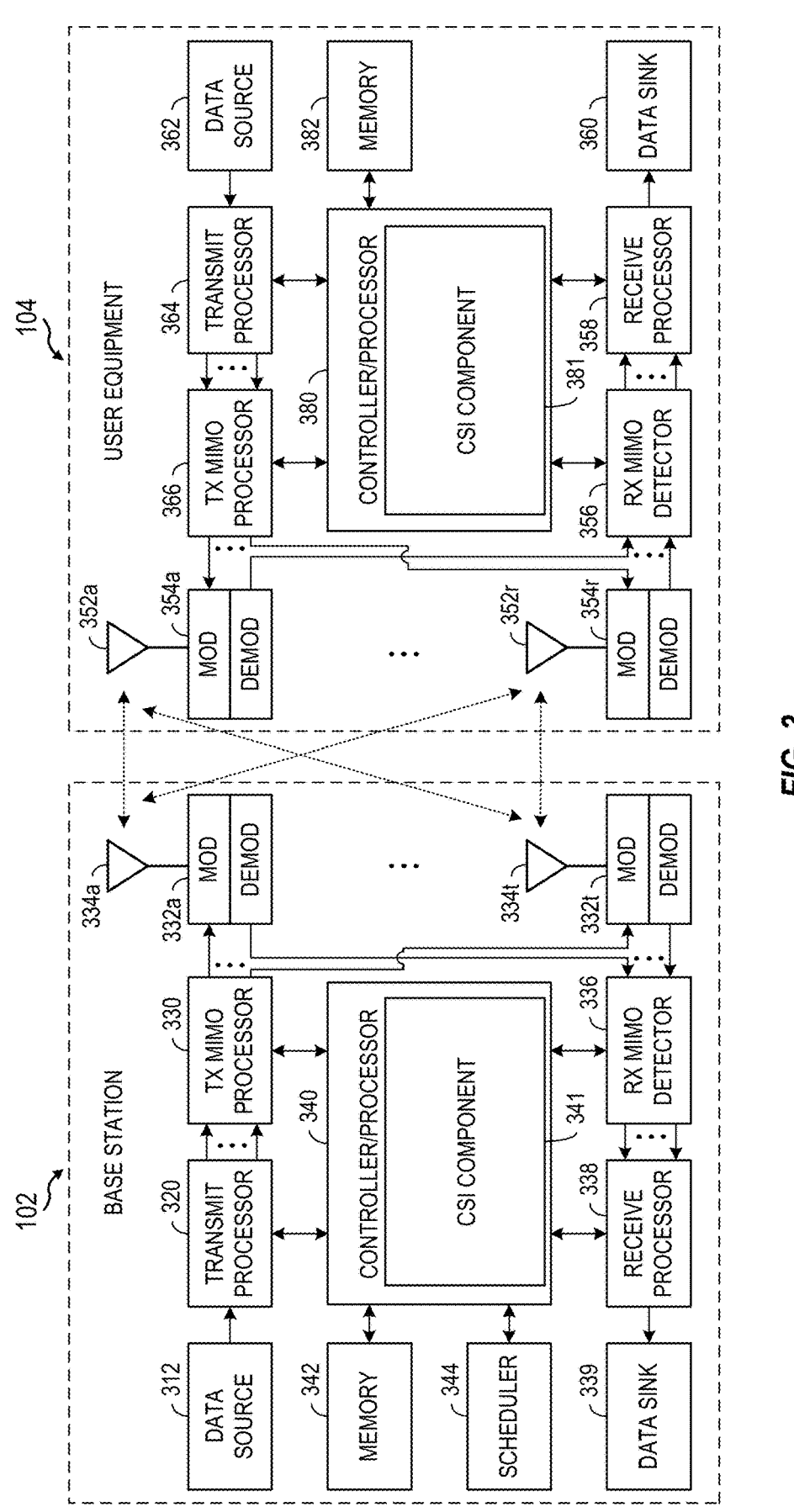
FIG. 3 depicts aspects of an example BS and an example user equipment (UE).

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

BS 102 includes controller/processor 340, which may be configured to implement various functions related to wireless communications. In the depicted example, controller/processor 340 includes CSI component 341, which may be representative of CSI component 199 of FIG. 1. Notably, while depicted as an aspect of controller/processor 340, CSI component 341 may be implemented additionally or alternatively in various other aspects of BS 102 in other implementations.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

UE 104 includes controller/processor 380, which may be configured to implement various functions related to wireless communications. In the depicted example, controller/processor 380 includes CSI component 381, which may be representative of CSI component 198 of FIG. 1. Notably, while depicted as an aspect of controller/processor 380, CSI component 381 may be implemented additionally or alternatively in various other aspects of UE 104 in other implementations.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

Figures 4A, 4B, 4C, 4D:
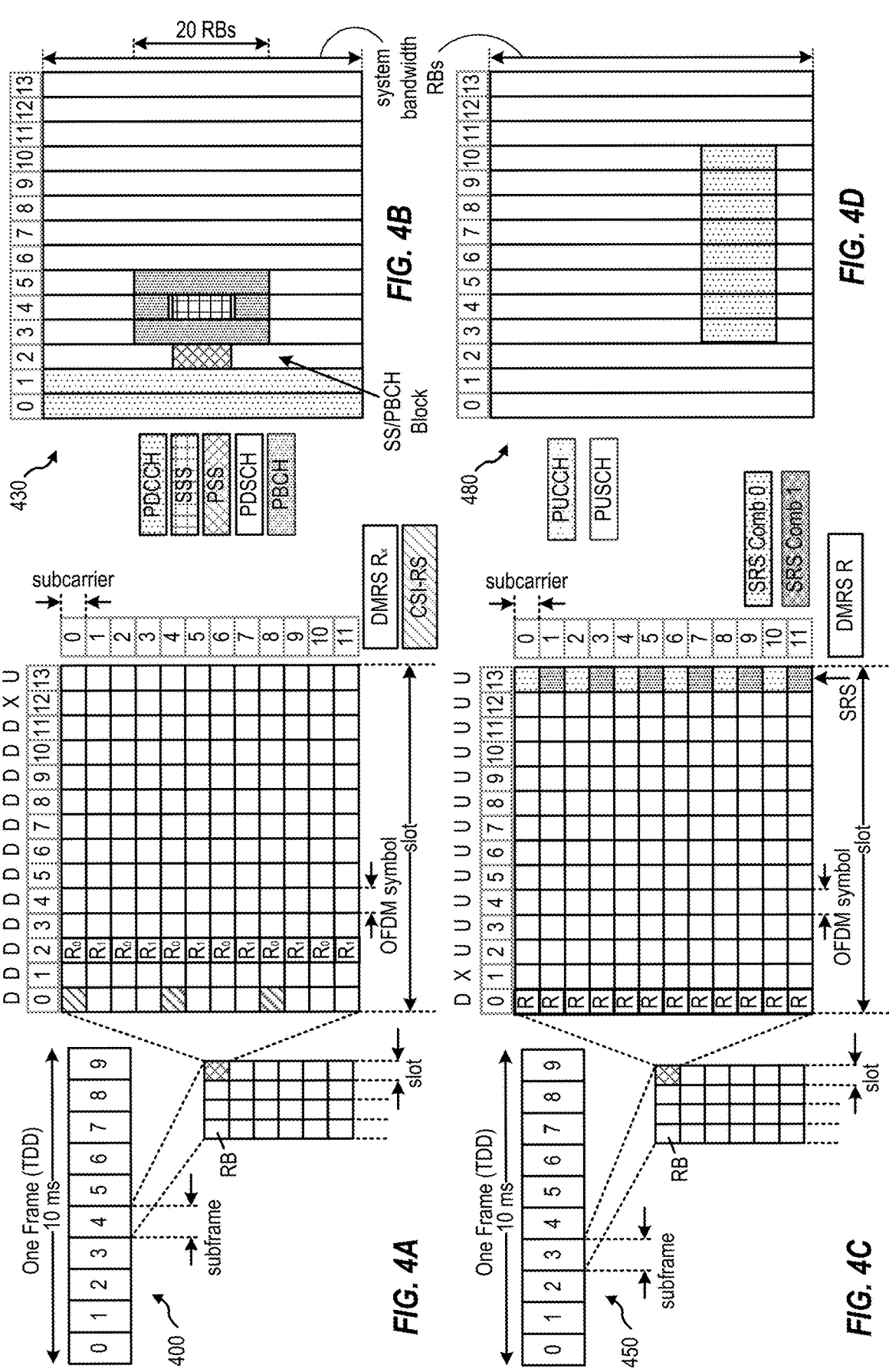
FIGS. 4A, 4B, 4C, and 4D depict various example aspects of data structures for a wireless communications network.

FIGS. 4A, 4B. 4C, and 4D depict aspects of data structures for a wireless communications network, such as wireless communications network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where Dis DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu} \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the BS. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a BS for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Introduction to mm Wave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

$5^{th}$ generation (5G) networks may utilize several frequency ranges, which in some cases are defined by a standard, such as 3rd generation partnership project (3GPP) standards. For example, 3GPP technical standard TS 38.101 currently defines Frequency Range 1 (FR1) as including 600 MHZ-6 GHZ, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mm Wave radio frequency band (e.g., 3 GHz-300 GHz) may have higher path loss and a shorter range compared to lower frequency communications. As described above with respect to FIG. 1, a base station (BS) (e.g., 180) configured to communicate using mmWave/near mmWave radio frequency bands may utilize beamforming (e.g., 182) with a user equipment (UE) (e.g., 104) to improve path loss and range.

Overview of Channel State Information (CSI)

Channel state information (CSI) indicates channel properties of a communication link. The CSI represents combined effects of, for example, scattering, fading, and power decay with distance between a transmitter device and a receiver device. Channel estimation using pilots, such as CSI reference signals (CSI-RS), may be performed to determine these effects on a channel. The CSI may be used to adapt transmissions based on current channel conditions, which is useful for achieving reliable communication, in particular, with high data rates in multi-antenna systems. The CSI is measured at the receiver device, quantized, and fed back to the transmitter device.

Time and frequency resources that can be used by a user equipment (UE) to report the CSI are controlled by a base station (BS) (e.g., gNB). The CSI may include channel quality indicator (CQI), precoding matrix indicator (PMI), CSI-RS resource indicator (CRI), SS/PBCH Block Resource indicator (SSBRI), layer indicator (LI), rank indicator (RI) and/or L1 reference signal received power (RSRP). However, as described below, additional or other information may be included in a CSI report.

A UE may be configured by a BS for CSI reporting. For example, the BS configures the UE with a CSI report configuration or with multiple CSI report configurations. The CSI report configuration may be provided to the UE via higher layer signaling, such as radio resource control (RRC) signaling (e.g., CSI-ReportConfig). The CSI report configuration may be associated with CSI-RS resources for channel measurement (CM), interference measurement (IM), or both. The CSI report configuration configures CSI-RS resources for measurement (e.g., CSI-ResourceConfig). The CSI-RS resources provide the UE with the configuration of CSI-RS ports, or CSI-RS port groups, mapped to time and frequency resources (e.g., resource elements (REs)). CSI-RS resources can be zero power (ZP) or non-zero power (NZP) resources. At least one NZP CSI-RS resource may be configured for CM.

For the Type II codebook, the PMI is a linear combination of beams; it has a subset of orthogonal beams to be used for linear combination and has per layer, per polarization, amplitude and phase for each beam. For the PMI of any type, there can be wideband (WB) PMI and/or subband (SB) PMI as configured.

The CSI report configuration may configure the UE for aperiodic, periodic, or semi-persistent CSI reporting. For periodic CSI, the UE may be configured with periodic CSI-RS resources. Periodic CSI on physical uplink control channel (PUCCH) may be triggered via RRC. Semi-persistent CSI reporting on physical uplink control channel (PUCCH) may be activated via a medium access control (MAC) control element (CE). For aperiodic and semi-persistent CSI on the physical uplink shared channel (PUSCH), the BS may signal the UE a CSI report trigger indicating for the UE to send a CSI report for one or more CSI-RS resources, or configuring the CSI-RS report trigger state (e.g., CSI-AperiodicTriggerStateList and CSI-Semi-PersistentOnPUSCH-TriggerStateList). The CSI report trigger for aperiodic CSI and semi-persistent CSI on PUSCH may be provided via downlink control information (DCI).

The UE may report the CSI feedback (CSF) based on the CSI report configuration and the CSI report trigger. For example, the UE may measure the channel on which the triggered CSI-RS resources (associated with the CSI report configuration) is conveyed. Based on the measurements, the UE may select a preferred CSI-RS resource. The UE reports the CSF for the selected CSI-RS resource. LI may be calculated conditioned on the reported CQI, PMI, RI and CRI; CQI may be calculated conditioned on the reported PMI, RI and CRI; PMI may be calculated conditioned on the reported RI and CRI; and RI may be calculated conditioned on the reported CRI.

Each CSI report configuration may be associated with a single downlink (DL) bandwidth part (BWP). The CSI report setting configuration may define a CSI reporting band as a subset of subbands of the BWP. The associated DL BWP may indicated by a higher layer parameter (e.g., bwp-Id) in the CSI report configuration for channel measurement and contains parameter(s) for one CSI reporting band, such as codebook configuration, time-domain behavior, frequency granularity for CSI, measurement restriction configurations, and the CSI-related quantities to be reported by the UE. Each CSI resource setting may be located in the DL BWP identified by the higher layer parameter, and all CSI resource settings may be linked to a CSI report setting have the same DL BWP.

In certain systems, the UE can be configured via higher layer signaling (e.g., in the CSI report configuration) with one out of two possible subband sizes (e.g., reportFreqCon-figuration contained in a CSI-ReportConfig) which indicates a frequency granularity of the CSI report, where a subband may be defined as $$N_{PRB}^{SB}$$

contiguous physical resource blocks (PRBs) and depends on the total number of PRBs in the bandwidth part. The UE may further receive an indication of the subbands for which the CSI feedback is requested. In some examples, a subband mask is configured for the requested subbands for CSI reporting. The UE computes precoders for each requested subband and finds the PMI that matches the computed precoder on each of the subbands.

Overview of Channel State Information (CSI) Feedback Coefficient Reporting

As noted above, a user equipment (UE) may be config-ured for channel state information (CSI) reporting, for example, by receiving a CSI configuration message from a base station (BS). In some cases, the UE may be configured to report at least a Type II precoder across configured frequency division (FD) units. For example, the precoder matrix $W_r$ for layer r includes the $W_1$ matrix, reporting a subset of selected beams using spatial compression and the $W_{2,r}$ matrix, reporting (for cross-polarization) the linear combination coefficients for the selected beams (2L) across the configured FD units:

$$W_r = \sum_{i=0}^{2L-1} b_i \cdot c_i, \text{ where } c_i = [\underbrace{c_{i,0} \cdots c_{i,N_3-1}}_{N_3}],$$

where $b_i$ is the selected beam, ci is the set of linear combi-nation coefficients (i.e., entries of $W_{2,r}$ matrix), L is the number of selected spatial beams, and $N_3$ corresponds to the number of frequency units (e.g., subbands, resource blocks (RBs), etc.). In certain configurations, L is radio resource control (RRC) configured. The precoder is based on a linear combination of digital fourier transform (DFT) beams. The Type II codebook may improve multi-user (MU) multiple input multiple output (MIMO) performance. In some con-figurations considering there are two polarizations, the $W_{2,r}$ matrix has size $2L \times N_3$.

Figure 5:
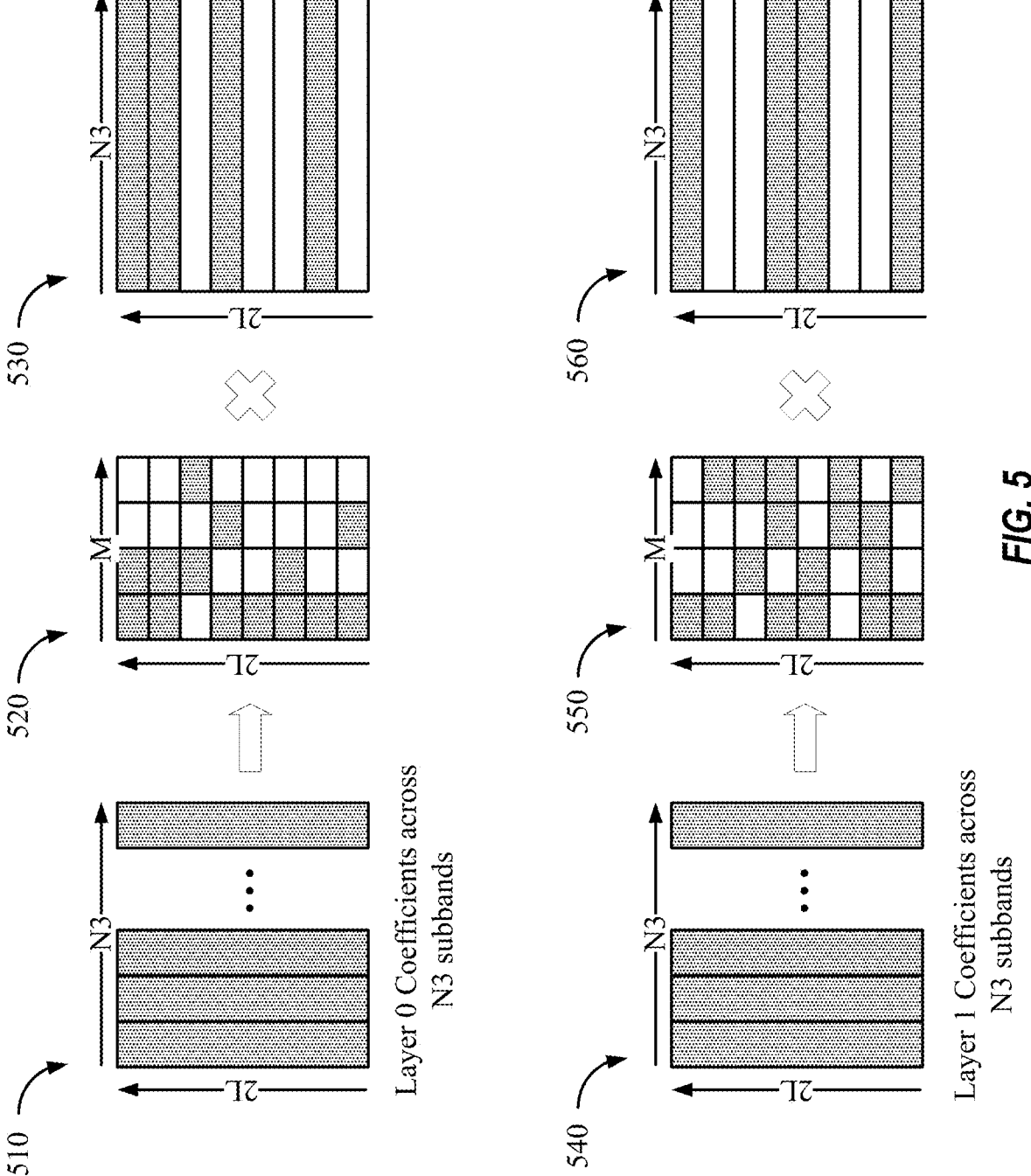
FIG. 5 depicts example precoder matrices.

In some cases, the UE may be configured to report FD compressed precoder feedback to reduce overhead of the CSI report. As depicted in FIG. 5, the precoder matrix ($W_{2,i}$) for layer i with i=0,1 may use an FD compression $$W_{f,i}^H$$

matrix to compress the precoder matrix into $\tilde{W}_{2,i}$ matrix size to $2L \times M$ (where M is network configured and communi-cated in the CSI configuration message via RRC or down-link control information (DCI), and $M < N_3$) given as:

$$W_i = W_1 \tilde{W}_{2,i} W_{f,i}^H$$

Where the precoder matrix $W_i$ (not shown) has $P = 2N_1N_2$ rows (spatial domain, number of ports) and $N_3$ columns (frequency-domain compression unit containing RBs or reporting sub-bands), and where M bases are selected for each of layer 0 and layer 1 independently. The $\tilde{W}_{2,0}$ matrix 520 consists of the linear combination coefficients (ampli-tude and co-phasing), where each element represents the coefficient of a tap for a beam. The $\tilde{W}_{2,0}$ matrix 520 as shown is defined by size $2L \times M$, where one row corresponds to one spatial beam in $W_1$ (not shown) of size $P \times 2L$ (where L is network entity configured via an RRC), and one entry therein represents the coefficient of one tap for this spatial beam. The UE may be configured to report (e.g., CSI report) a subset $K_0 < 2LM$ of the linear combination coefficients of the $\tilde{W}_{2,0}$ matrix 520. For example, the UE may report $K_{NZ,i} < K_0$ coefficients (where $K_{NZ,i}$ corresponds to a maxi-mum number of non-zero coefficients for layer-i with i=0 or 1, and $K_0$ is network configured via RRC) illustrated as shaded squares (unreported coefficients are set to zero). In some configurations, an entry in the $\tilde{W}_{2,0}$ matrix 520 cor-responds to a row of $$W_{f,0}^H$$

matrix 530. In the example shown, both the $\tilde{W}_{2,0}$ matrix 520 at layer 0 and the $\tilde{W}_{2,0}$ matrix 450 at layer 1 are $2L \times M$. The $$W_{f,0}^H$$

matrix 530 is composed of the basis vectors (each row is a basis vector) used to perform compression in frequency domain. In the example shown, both the $$W_{f,0}^H$$

matrix 530 at layer 0 and the $$W_{f,1}^H$$

matrix 560 at layer 1 include M=4 FD basis (illustrated as shaded rows) from $N_3$ candidate DFT basis. In some configurations, the UE may report a subset of selected basis of the $$W_{f,i}^H$$

matrix via CSI report. The M bases specifically selected at layer 0 and layer 1. That is, the M bases selected at layer 0 can be same/partially-overlapped/non-overlapped with the M bases selected at layer 1.

Overview of User Equipment (UE) Precoding Matrix Indicator (PMI) Codebook-based Channel State Feedback (CSF)

A precoding matrix indicator (PMI) codebook refers to a dictionary of PMI entries. In this way, using a PMI codebook, each PMI component from a pre-defined set can be mapped to bit-sequences reported by a user equipment (UE). A network entity receiving a bit-sequence (e.g., as channel state feedback (CSF)) can then obtain a corresponding PMI from the reported bit-sequence.

How the UE calculates PMI may be left to the UE implementation. However, how the UE reports the PMI should follow a format defined in the codebook, so the UE and the network entity each know how to map PMI components to reported bit-sequences.

FIG. 6 depicts example codebook-based CSF 600. As depicted, a UE may first perform channel estimation (at 602) based on channel state information (CSI) reference signal (RS) to estimate channel H. A CSI calculating block 604 may generate a bit sequence a. As illustrated, bit sequence a may be generated looking for PMI components from the pre-defined PMI codebook for radio channel H or precoder W (at block 606) and mapping the PMI components to the bit sequence a, via block 608. This mapping, from a set of predefined PMI components acts as a form of quantization. The UE transmits the bit sequence a to the BS (e.g., in a CSI report), via block 610.

As depicted in FIG. 6, at the network entity side, the network entity receives the bit sequence a reported by the UE. The network entity then follows the codebook to obtain each PMI component using the reported bit-sequence a and reconstructs the actual PMI, at block 612, using each PMI component (obtained from the codebook), to recover the radio channel H or precoder W.

FIG. 7 depicts various scenarios 700 for a coherent joint transmission (CJT). The scenarios are referred to as Scenario 1A, where co-located transmitter receiver points (TRPs)/panels (intra-site) have a same orientation and Scenario 1B, where the panels have different orientations (inter-sector). Another scenario, Scenario 2, may involve distributed TRPs (inter-site).

Figure 8:
FIG. 8 depicts example content of enhanced type-II (eType-II) channel state information (CSI).

FIG. 8 depicts an example 800 for enhanced Type-II (eType-II) CSI. In this example 800, for each layer, the precoder across a number of $N_3$ (PMI-) subbands is a $N_t \times N_3$ matrix:

$$W: W = W_1 \times \tilde{W}_2 \times W_f^H.$$

where spatial division (SD) bases $W_1$ (direct fourier transform (DFT) bases) is a $N_t \times 2L$ matrix, $W_1$ is layer-common, $N_t = 2N_1 O_1 N_2 O_2$ (number of Tx antennas—with $O_1$ and $O_2$ oversampling) is radio resource control (RRC) configured, L={2, 4, 6} (number of beams) is RRC-configured FD bases $W_f$ (DFT bases) is a $M \times N_3$ matrix. $W_f$ is layer-specific, M (number of FD bases) is rank-pair specific, i.e. $M_1 = M_2$ for rank={1,2}, and $M_3 = M_4$ for rank={3,4}, $M_1$ or $M_3$ is RRC-configured. Coefficients matrix $\tilde{W}_2$ is a $2L \times M$ matrix and is layer-specific. For each layer, a UE may report up to $K_0$ non-zero coefficients, where $K_0$ is RRC-configured. Across all layers, the UE may report up to $2K_0$ non-zero coefficients, where unreported coefficients may be set to zeros.

FIG. 9 depicts example scenarios 900 for spatial division multiplexed (SDM) based non-coherent joint transmission (NCJT), in which data is precoded separately on different TRPs. FIG. 9 also depicts example CJT, in which data is precoded in a fully-joint way. According to one option, data may be precoded with separate precoder with co-phase and amplitude coefficients. It is also possible that the co-phase/amplitude is implicitly accommodated into the precoder (thus the equation can appear with no difference from NCJT case). Port diagrams for a NCJT, a first option of a CJT, and a second option of a CJT, are also depicted in example CJT and NCJT scenarios 1000 of FIG. 10.

Overview of Strongest Coefficient Indication (SCI)

In some cases, calculating a precoder for use in a coherent joint transmission (CJT) involves matrix-multiplying a spatial division (SD) basis matrix by a matrix of coefficients and a frequency division (FD)-basis matrix. For a type-II codebook, the matrix of coefficients may be signaled to a network entity (e.g., a network entity or a transmitter receiver point (TRP)) by a user equipment (UE).

Figure 11:
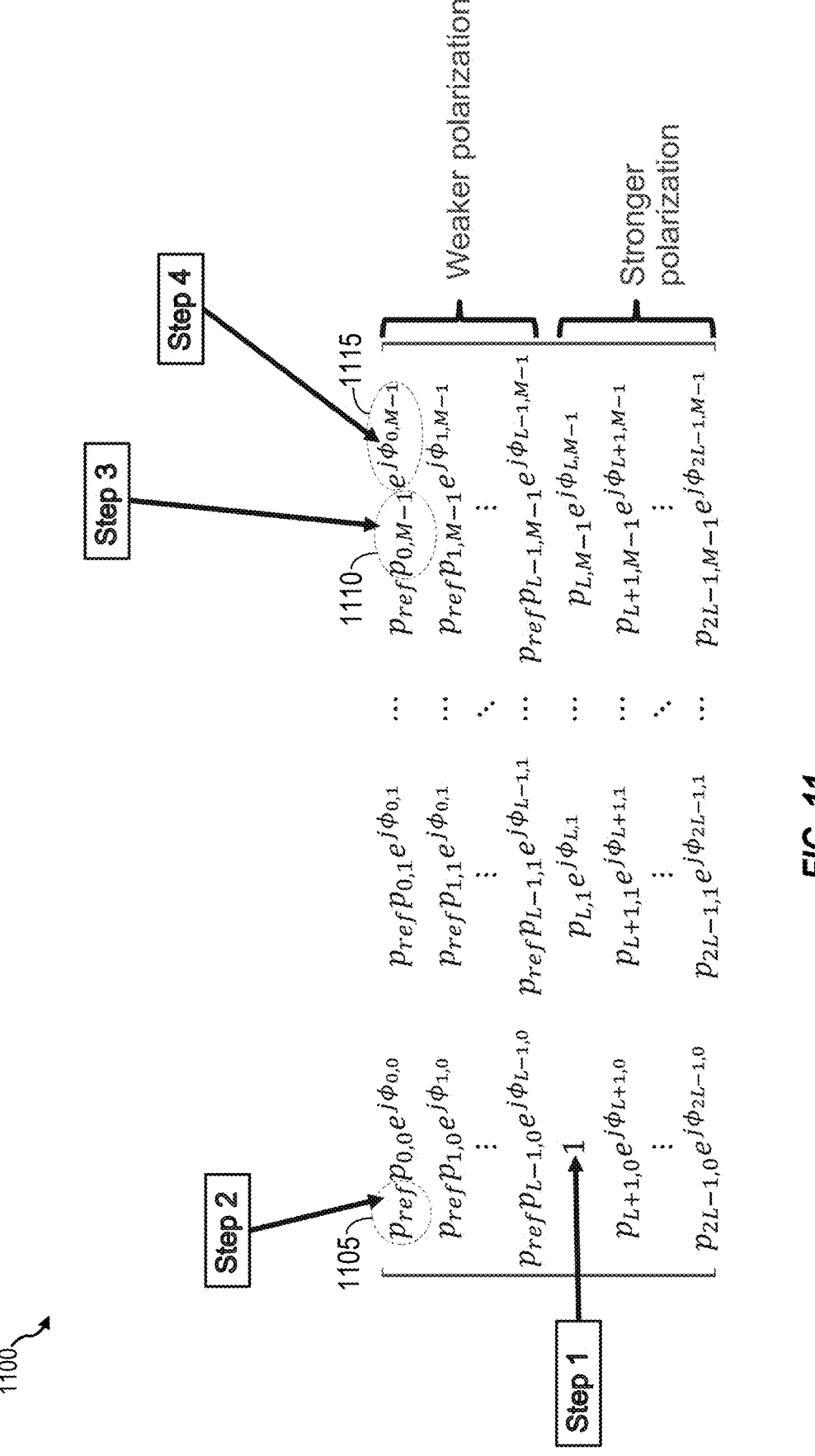
FIG. 11 depicts example technique for performing strongest coefficient indication (SCI) based differential quantization.

Strongest coefficient indication (SCI) based differential quantization is a technique for a UE to signal a matrix of coefficients. FIG. 11 depicts example technique for performing strongest coefficient indication (SCI) based differential quantization. As depicted, a matrix 1100 is an example matrix of coefficients, $\tilde{W}_2$, with each coefficient the product of a reference power $p_{ref}$ (shown at 1105), a differential amplitude $p_{0,0}$ (shown at 1110), and a phase, $e^{j\Phi_{0,0}}$, etc. (shown at 1115). In a first step of SCI-based differential quantization, a UE determines which coefficient in the matrix is the strongest coefficient. The index of that coefficient is reported by the UE, but that coefficient is not quantized, as it is set to 1 and used a reference for the stronger polarization. In a second step, a reference power for the weaker polarization, $p_{ref}$, is determined and quantized with four bits, with values ranging from 0 dB to −24 dB in −1.5 dB steps. In a third step, differential amplitudes for the coefficients are determined and quantized with three bits, with values ranging from 0 dB to −24 dB in −3 dB steps. In a fourth step, the phases of each of the coefficients are quantized using a 16 phase-shift keying (16PSK) alphabet. After quantizing each of the non-zero coefficients (NZCs) of $\tilde{W}_2$, the UE transmits the quantized values to a network entity for the network entity to use when making a coherent joint transmission to the UE.

In some cases, codebook subset restriction (CBSR), is used to avoid and/or reduce interference to certain directions for a precoded transmission. When using the CBSR for a Rel-16 enhanced Type-II codebook, a network entity may configure a bit sequence $B=B_1B_2$ to a UE, for a FD-average power restriction of certain SD bases. $B_1$ represents 4 selected SD-oversampling groups, with $$\left\lceil \log_2 \binom{O_1O_2}{4} \right\rceil$$

bits, e.g., $B_1$ has 11 bits for oversampling factor $O_1=4$ and $O_2=4$. $B_2$ represents a power restriction of each spatial basis in the selected SD-oversampling groups and has 2 bits to represent the maximum amplitude $\gamma_i$ of each SD basis i, for both polarizations p=0, 1. Thus, for 4 SD-oversampling groups, each with $N_1N_2$ SD bases, $8N_1N_2$ bits in total are used to convey $B_2$.

Figure 12:
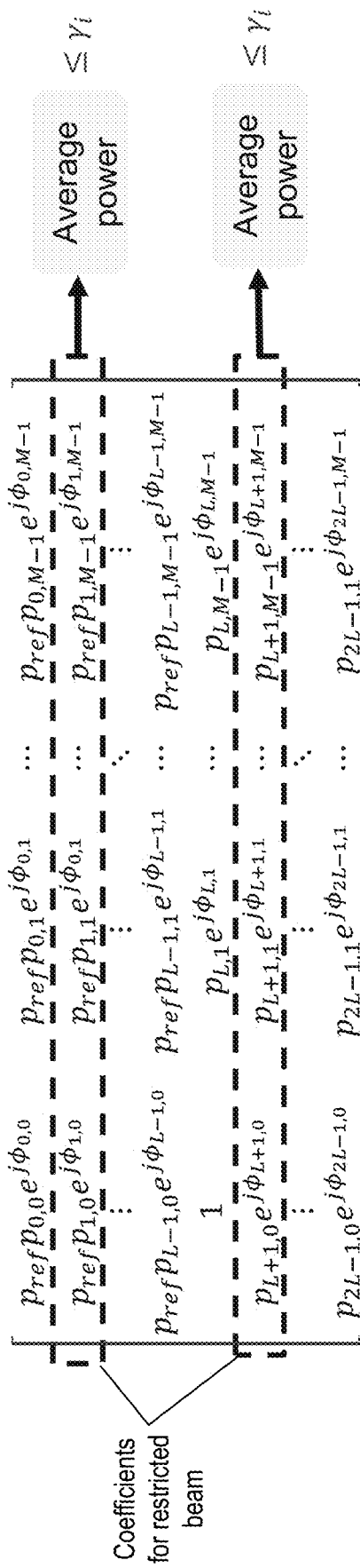
FIG. 12 depicts example CB subset restriction (CBSR).

FIG. 12 depicts example CBSR. As depicted, the CBSR with coefficients in highlighted rows of a matrix 1200 are determined to maintain an average power in a direction of a restricted beam at less than or equal to $\gamma_i$.

FIG. 13 depicts example bitmap 1300 for a CBSR (for $B_2$). As depicted, a value of 00 for $B_2$ corresponds to a maximum average coefficient amplitude of 0. A value of 01 for $B_2$ corresponds to a maximum average coefficient amplitude of $\sqrt{1/4}$, a value of 10 for $B_2$ corresponds to a maximum average coefficient amplitude of $\sqrt{1/2}$, and a value of 11 for $B_2$ corresponds to a maximum average coefficient amplitude of 1.

Overview of Coherent Joint Transmission (CJT) Multi-TRP (mTRP) Codebooks (CBs)

In some wireless communications systems, a network entity is associated with multiple transmission reception points (TRPs) or cells, which may simultaneously or concurrently transmit a similar signal (or data) over a same frequency channel. In such systems, a user equipment (UE) may communicate with more than one TRP using coordinated multi point (CoMP) operations. The CoMP operations are based on coherent joint transmissions (CJTs) or non-CJTs (NCJTs).

During a CJT process, the network entity configures multiple TRPs (e.g., upto four TRPs) to transmit one or more channel state information (CSI) reference signals (RSs) in one or more resource elements (REs) of a resource block (RB). Each TRP may transmit a CSI-RS using a single antenna or multiple antennas. The network entity may also be configured to receive CSI reports as a feedback from the UE. The CSI reports include one or more precoding matrix indicators (PMIs) based on the one or more CSI-RSs. A PMI indicates relative phase information between the multiple TRPs (e.g., a first TRP and a second TRP, when there are two TRPs for the CJT process). The network entity configures the multiple TRPs for a CJT to the UE based at least on the relative phase information. The CJT may be a CoMP transmission in which the signals from the multiple TRPs are received in-phase (e.g., coherently) by the UE. The CJT may include information transmitted on a downlink shared channel and/or a downlink control channel. In some cases, the one or more CSI-RSs may be transmitted by the multiple TRPs during a same time and frequency resource.

In some cases, the network entity configures a maximum number of TRPs (e.g., $N_{TRP}$) that can participate in the CJT, and the UE selects an exact number of TRPs (e.g., from the maximum number of TRPs) participating in the CJT for which channel state information (CSI) has to be reported.

Figure 14:
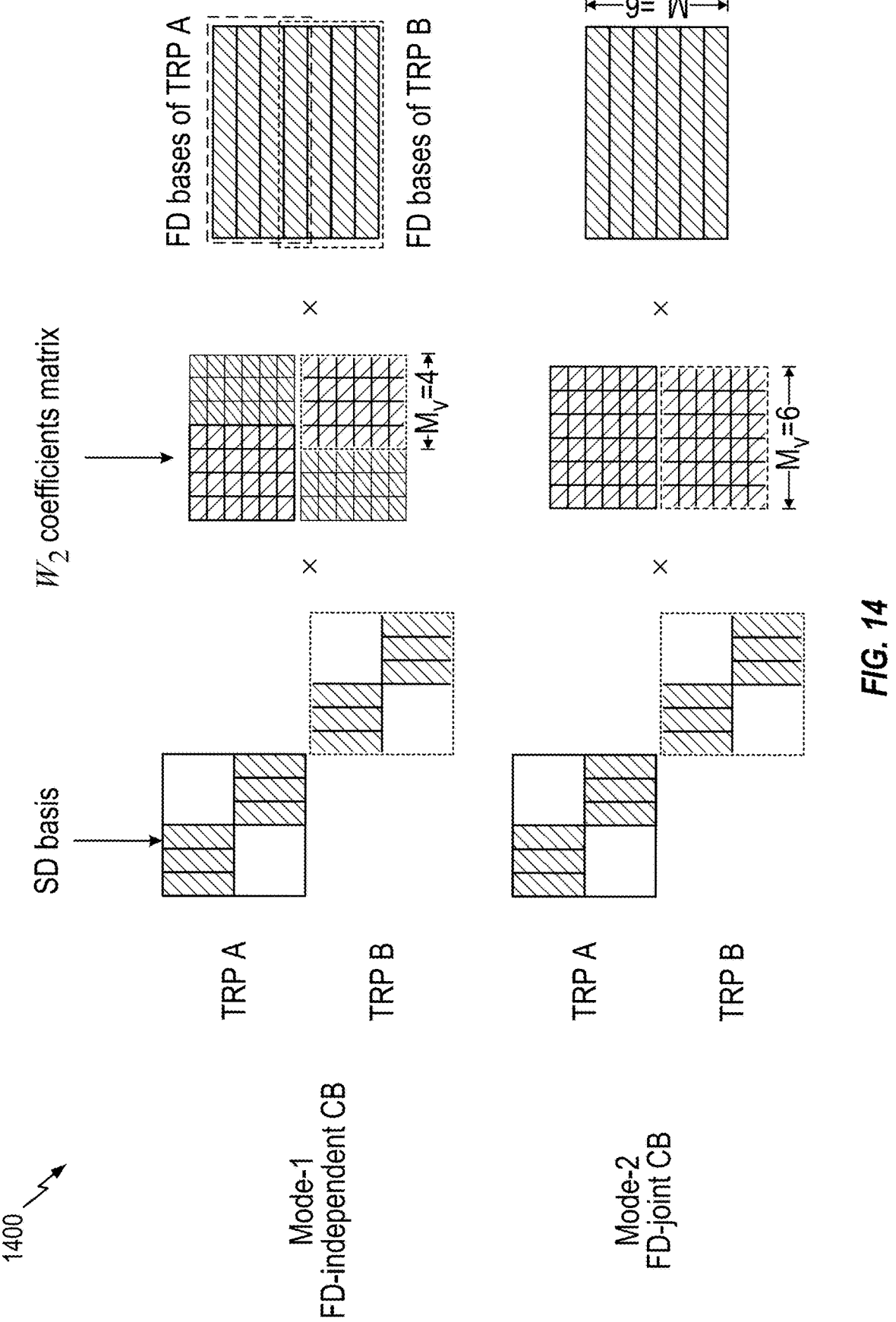
FIG. 14 depicts example modes for CB structure depending on a frequency division (FD) bases for multiple TRP (mTRP) CJT.

In some cases, for the CJT from the multiple TRPs, two modes for a codebook (CB) structure are provided. The two modes depend on frequency division (FD) bases. As depicted in illustration 1400 of FIG. 14, the two modes include a first mode (e.g., Mode-1 FD-independent CB) for the CJT from two TRPs (e.g., TRP A and TRP B) and a second mode (e.g., Mode-2 FD-joint CB) for the CJT from the two TRPs. In the second mode, a diagonal spatial division (SD) basis matrix is constructed of a number of rows for each TRP equal to a number of antennas of that TRP and a number of columns equal to two times a number of beams (L). A precoder matrix of coefficients ($W_2$) has a number of rows for each TRP equal to 2L and a number of columns equal to a number of FD bases (M) that are selected. The FD basis matrix has M rows. Accordingly, the $W_2$ has 2L rows and M columns. In the second mode, every TRP also selects a same FD basis.

In some cases, for a type-II CB refinement for the CJT (e.g., with $N_{TRP}>1$ TRP/TRP-groups), a channel measurement resource (CMR) includes non-zero-power (NZP) CSI-RS resources (e.g., K CSI-RS resources>1). One CSI-RS resource corresponds to one TRP/TRP-group (i.e., $K=N_{TRP}$). Each CSI-RS resource has a same number of CSI-RS ports. In such cases, the network entity may configure values of CB parameters ($N_1$, $N_2$; R, $\beta$) via a radio resource control (RRC) signaling and the values of CB parameters are common across all the CSI-RS resources. In some cases, since parameters ($O_1$, $O_2$) are fixed for a given ($N_1$, $N_2$), ($O_1$, $O_2$) are also common across all the CSI-RS resources. In some cases, since $N_3$ is inferred from a number of channel quality indicator (CQI) subbands, the parameters R, $N_3$ are also common across all the CSI-RS resources. In some cases, since per-layer $K_0$ is defined jointly across all the CSI-RS resources, so is $\beta$ defined jointly across all the CSI-RS resources.

Figure 15:
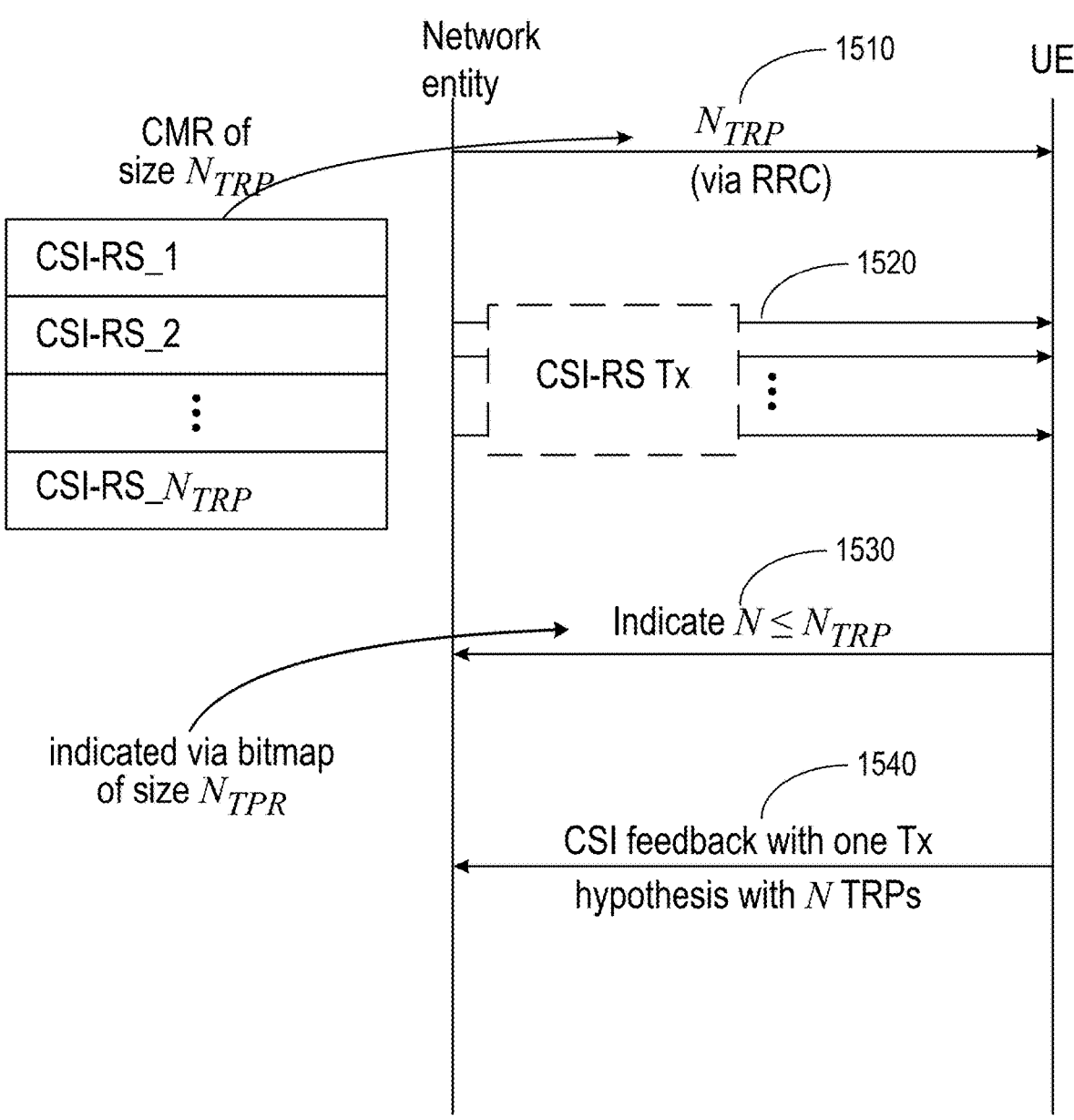
FIG. 15 depicts a call flow diagram illustrating example communication among a UE and a network entity.

As depicted in FIG. 15, at 1510, a network entity sends signaling (e.g., RRC signaling) indicating a maximum number of TRPs (e.g., $N_{TRP}$) that can participate in a CJT to a UE. The signaling to indicate the $N_{TRP}$ may be implicit via a size of a channel measurement resource (CMR) configuration, which is sent from the network entity to the UE.

In some cases, a same spatial dictionary CB is assumed from each TRP that can participate in the CJT, since CB parameters ($(N_1, N_2)$ and $(O_1, O_2)$) are common for all CSI-RS resources in the CMR configuration.

At 1520, each TRP (e.g., of the maximum number of TRPs) sends a CSI-RS to the UE. For example, when there are five TRPs, five CSI-RSs from the five TRPSs are sent to the UE.

At 1530, the UE sends an indication of a number of TRPs (e.g., N TRPs) from the maximum number of TRPs that can participate in the CJT (e.g., via a bitmap of size $N_{TRP}$). The number of TRPs is less than or equal to the maximum number of TRPs.

At 1540, the UE sends a CSI feedback (e.g., indicating CSI information and a precoder matrix to use), based on the CSI-RSs from the N TRPs. In some cases, based on UE implementation, the UE may test $2^{N_{TRP}}$ transmission (Tx) hypotheses, but report the CSI feedback corresponding to only one hypothesis (e.g., which is based on the N TRPs). In some cases, the CSI feedback may indicate a first mode CB or a second mode CB. The first mode CB corresponds to $$\begin{bmatrix} W_{1,1}\tilde{W}_{2,1}W_{f,1}^H \\ \vdots \\ W_{1,N}\tilde{W}_{2,N}W_{f,N}^H \end{bmatrix},$$

and the second mode CB corresponds to $$\begin{bmatrix} W_{1,1} \tilde{W}_{2,1} W_f^H \\ \vdots \\ W_{1,N} \tilde{W}_{2,N} W_f^H \end{bmatrix}.$$

In some cases, for a joint transmission in a CJT, participating TRPs may need to co-phase their transmissions from the respective TRPs (e.g., as phase coherence between the participating TRPs is needed for the CJT). For example, when N number of TRPs are participating in the CJT, N−1 number of transmissions from N−1 number of TRPs may need to be aligned (e.g., with respect to a reference TRP). So, in such cases, the network entity may need co-phase information for at least the N−1 number of TRPs.

In some cases, a number of scenarios may cause phase coherence disruption between the TRPs participating in the CJT. In one example scenario, a position change of a UE with respect to at least one of the TRPs may alter effective propagation delays and distance of the UE from the respective TRPs. In another example scenario, a time offset between a CSI-RS burst (e.g., used for the CJT CSI measurement and reporting) and an actual CJT physical downlink shared channel (PDSCH) transmission (e.g., based on the CSI) may be too large. In another example scenario, some of the participating TRPs in the CJT may switch transmit/receive mode or a multiple input multiple output (MIMO) mode.

As noted above, the position change of the UE with respect to the at least one of the TRPs may cause the phase coherence disruption between the TRPs participating in the CJT. For example, as depicted in illustration 1600 of FIG. 16, at time $t_0$, a UE is at a first position with respect to TRP1 and TRP2. While in the first position, the UE is at a distance $d_1$ from TRP1 and at a distance $d_2$ from TRP2, and a phase angle $(\phi_{t_0})$ is based on a difference between the distance $d_1$ and the distance $d_2$ relative to a wavelength $(\lambda)$.

Figure 17:
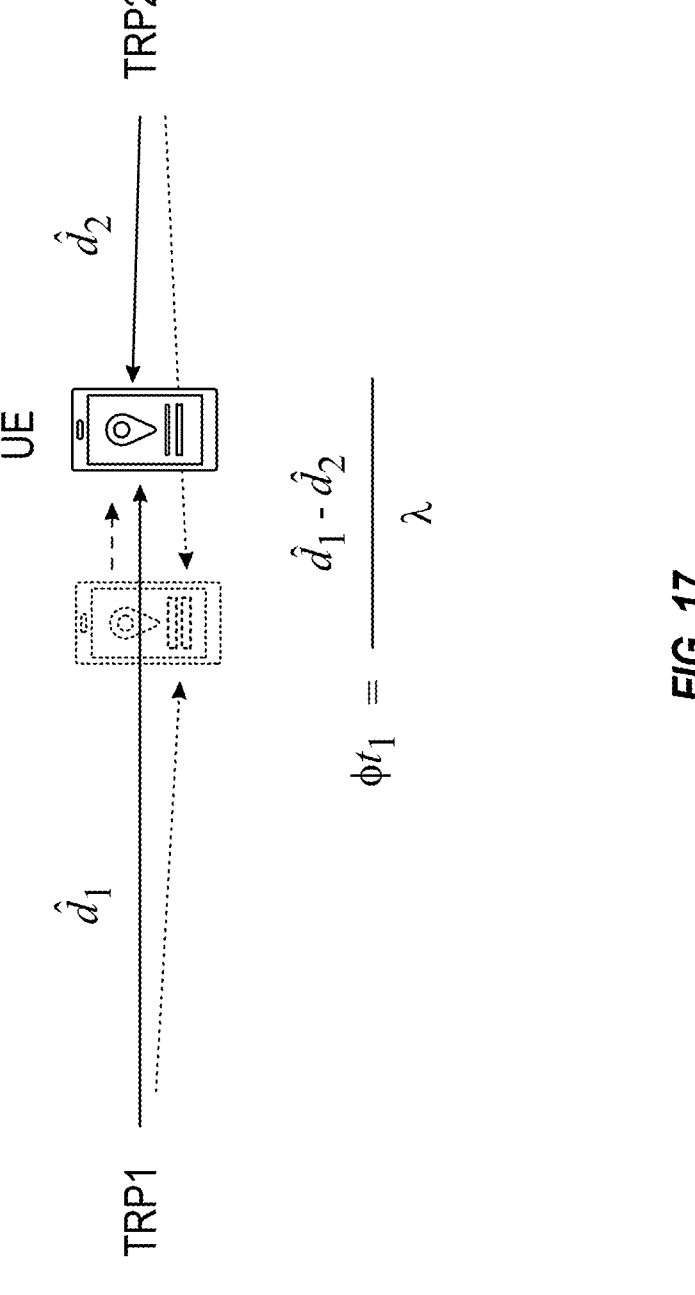
FIG. 17 depicts a second position of a UE with respect to two TRPs.

As depicted in illustration 1700 of FIG. 17, at time $t_1$, when the UE moves from the first position to a second position (e.g., 2.5 millimeters (mm) ($\lambda/4$) position change at 30 gigahertz (GHz) carrier frequency), the UE is now at a distance $\hat{d}_1$ from TRP1 and at a distance $\hat{d}_2$ from TRP2, and a phase angle $(\phi_{t_1})$ is based on a difference between the distance $\hat{d}_1$ and the distance $\hat{d}_2$ relative to $\lambda$. The value of $\phi_{t_1}$ corresponds to 180° relative phase change from the value of $\phi_{t_0}$.

Figure 18:
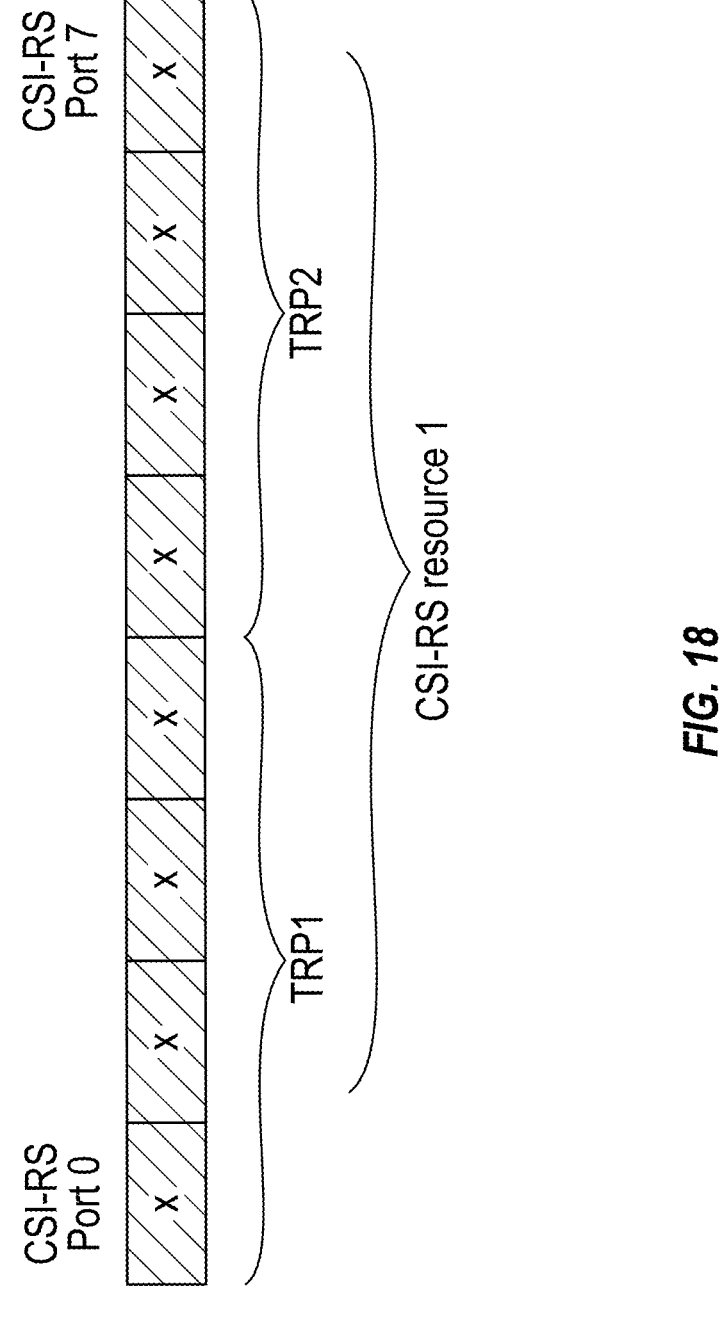
FIG. 18 depicts example first CSI reference signal (RS) resource across multiple TRPs.
Figure 19:
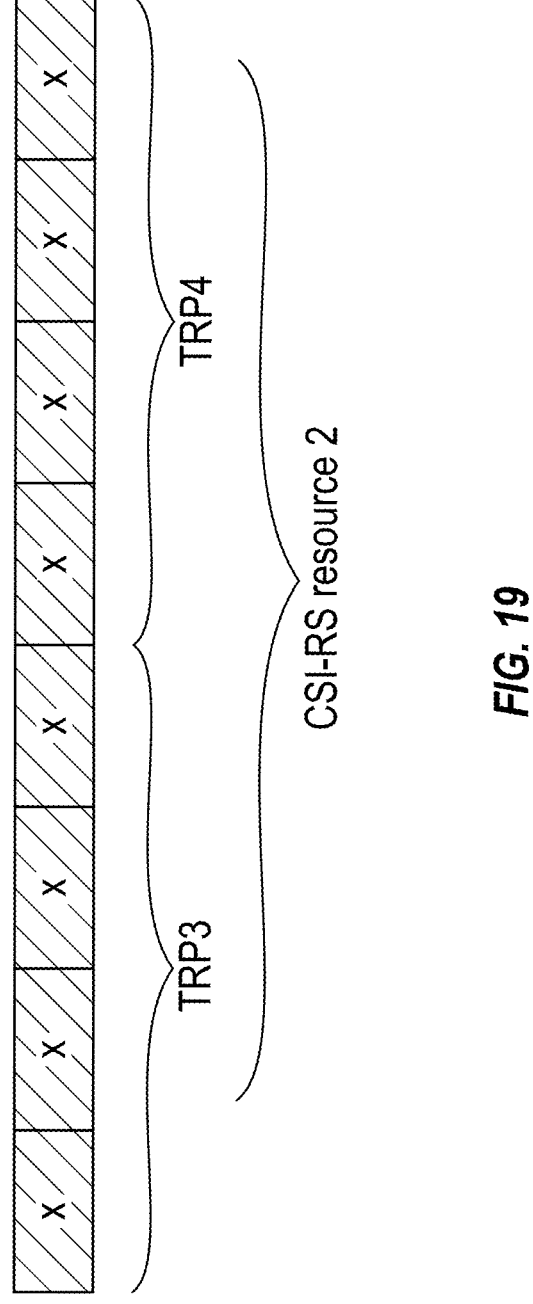
FIG. 19 depicts example second CSI-RS resource across multiple TRPs.

In some cases, to address or prevent the phase coherence disruption between the TRPs participating in the CJT, the network entity configures one CSI-RS resource across the multiple TRPs (e.g., without explicitly indicating to the UE, i.e., being transparent to the UE). This reduces a total number of CSI-RS resources with respect to a total number of TRPs in a CMR. For example, there may be two CSI-RS resources, while the number of TRPs participating in the CJT may be four. As depicted in illustration 1800 of FIG. 18, a first CSI-RS resource is configured for TRP1 and TRP2, and each TRP has four antenna ports that are used for transmitting CSI-RSs. Similarly, as depicted in illustration 1900 of FIG. 19, a second CSI-RS resource is configured for TRP3 and TRP4, and each TRP has four antenna ports that are used for transmitting CSI-RSs. In FIG. 18 and FIG. 19, x corresponds to an antenna port associated with a TRP, and a combined CB parameter across the TRPs needs to be restricted to CB parameters ($N_1$, $N_2$) for all CSI-RS resources.

When one CSI-RS resource is configured for the multiple TRPs, the network entity may need fewer co-phase information associated with the TRPs (e.g., only for TRP1 or TRP2, TRP3 or TRP4 as opposed for all TRPs of FIG. 18 and FIG. 19) in a co-phase information report from the UE, and this may save overall CSI report overhead. However, the issue with this approach is that the network entity may also need separate a CMR indicating such joint CSI-RS resources (that is, grouping information related to all TRPs grouped for each single CSI-RS resource) to the UE. Also, in such cases, the UE may not be flexible to select any TRPs for the CJT. For example, the UE may not be able to select TRP2 and TRP3 of FIG. 18 and FIG. 19 for the CJT, since these TRPs are configured for the different CSI-RS resources. Furthermore, this approach may also implicitly cause reconfiguration of the $N_{TRP}$ as the UE may think that a less number of TRPs are participating in the CJT.

In some cases, current approaches are unable to ensure co-phasing across the multiple TRPs or different TRP groups. In some cases, the UE captures phase compensation across the TRPs via an individual precoding matrix feedback (e.g., $W_{2,n}$ feedback) indicating $$\begin{bmatrix} e^{j\psi_1} W_{1,1} \tilde{W}_{2,1} W_{f,1}^H \\ \vdots \\ e^{j\psi_N} W_{1,N} \tilde{W}_{2,N} W_{f,N}^H \end{bmatrix}$$

sent to the network entity. In such cases, since the phase coherence between the TRPs may break more dynamically (e.g., than a periodicity of the CJT CSI feedback), the UE may need to report the full individual precoding matrix feedback more frequently (i.e., each time the phase coherence may break between the TRPs). In some cases, a required phase difference is indicated across the CSI-RS resources in the CMR selected by a UE (i.e., N≤$N_{TRP}$) based on a configuration. That is, the phase difference is across the selected N number of TRPs for reporting in the CSI feedback.

In some cases, based on a network entity implementation, there may not be a need for co-phasing information for all TRPs participating in the CJT. In such cases, the network entity may be able to enforce phase coherence between a subset of the TRPs participating in the CJT. The subset of the TRPs may be located at a same network entity tower or operate together.

In some cases (e.g., in a green network), a network entity may need the UE to (not) select the subset of the TRPs. This may be due to a power saving feature where when one TRP is not selected, another TRP may be indirectly ruled out. Such scenarios may be more critical when the $N_{TRP}$ is large (e.g., at a higher frequency operation and ultra dense deployments) and several options may be possible for grouping the TRPs to serve single/multiple UEs.

Aspects Related to Overhead Reduction for Coherent Joint Transmission (CJT) Channel State Information (CSI) Feedback Aspects of the present disclosure provide apparatuses, methods, processing systems, and computer-readable mediums for managing coherent joint transmission (CJT) channel state information (CSI) feedback.

In some wireless network deployments, a network entity may be associated with multiple transmission reception points (TRPs), which may simultaneously or concurrently transmit a similar signal over a same frequency channel. In such deployments, a user equipment (UE) may communicate with more than one TRP using coordinated multi point (CoMP) operations. The CoMP operations may be based on a CJT process. A CJT may be a COMP transmission in which the signals from the multiple TRPs are received in-phase (e.g., coherently) by the UE.

During the CJT process, the network entity may configure the TRPs to transmit one or more CSI reference signals (RSs) to the UE. The network entity may also be configured to receive a CSI report from the UE. The CSI report indicates one or more precoding matrix indicators (PMIs) based on the one or more CSI-RSs. A PMI indicates relative phase information between the TRPs. The network entity configures the TRPs for the CJT based on the relative phase information.

In some cases, a CSI-RS resource is configured for each TRP. That is, a plurality of CSI-RS resources may be configured for a plurality of TRPs participating in the CJT (e.g., for transmitting a plurality of CSI-RSs). In such cases, the UE may send the CSI report indicating the relative phase information for each CSI-RS resource of the plurality of CSI-RS resources, which may increase overall CSI report signaling overhead.

To reduce the CSI report signaling overhead, techniques presented herein may enable CSI reporting of the relative phase information for one or more subsets of CSI-RS resources of the plurality of CSI-RS resources. For example, the network entity may provide information associated with the one or more subsets of CSI-RS resources to the UE, and the UE may provide the relative phase information for the one or more subsets of CSI-RS resources instead for each CSI-RS resource to the network entity. For example, each subset of CSI-RS resources may be associated with a subset of TRPs that may be located at a same location, that may operate together, or that may share a same radio frequency (RF) chain or a same digital port.

The techniques proposed herein may be understood with reference to FIGS. 20-28.

Figure 20:
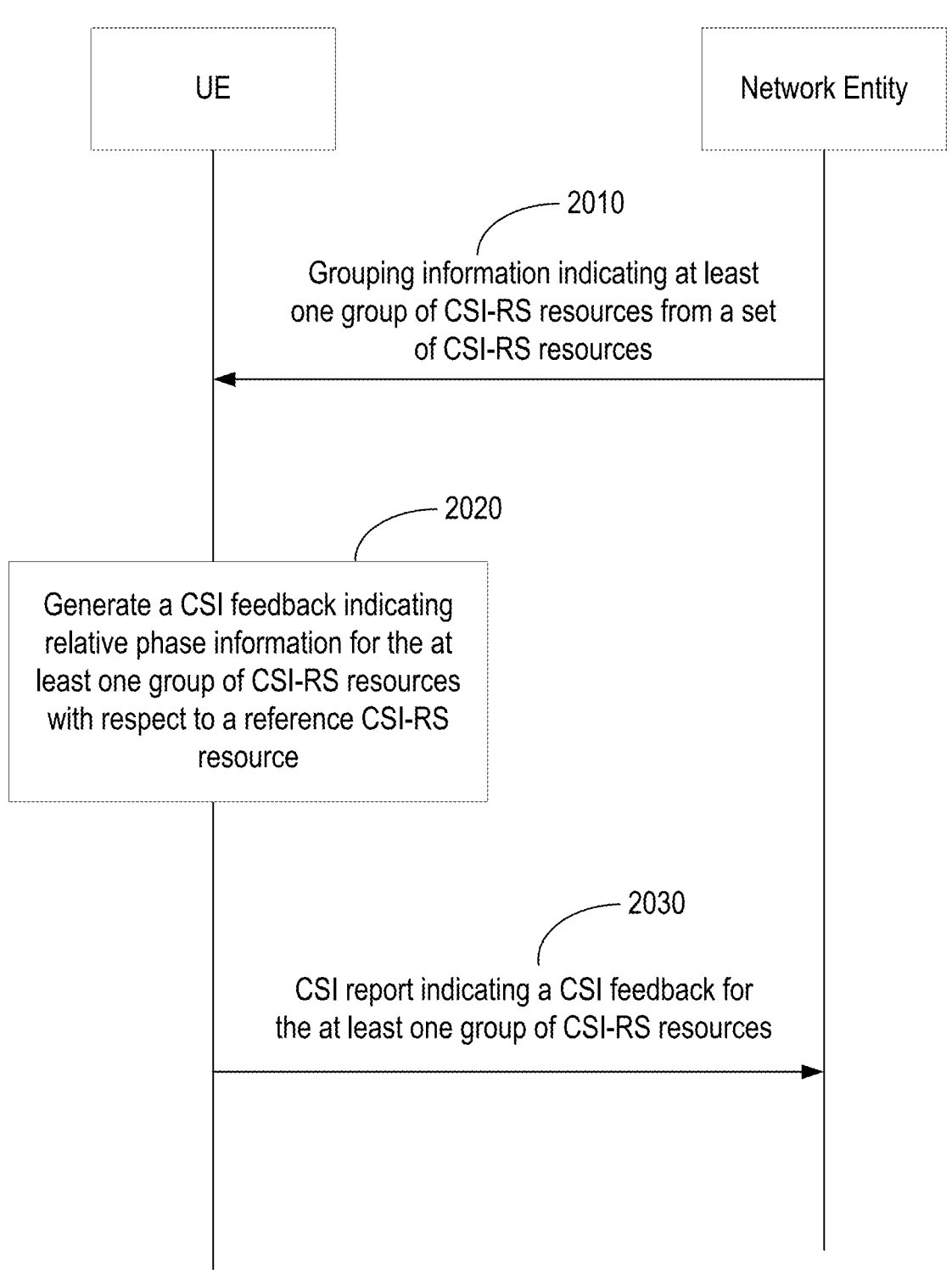
FIG. 20 depicts a call flow diagram illustrating example communication among a UE and a network entity.

FIG. 20 depicts a call flow diagram illustrating example communication among a UE (e.g., such as the UE 104 depicted and described with respect to FIGS. 1 and 3) and a network entity (e.g., such as the BS 102 depicted and described with respect to FIGS. 1 and 3, or the disaggregated BS depicted and described with respect to FIG. 2).

At 2010, the network entity transmits grouping information to the UE. The grouping information indicates at least one group of CSI-RS resources (e.g., M groups of CSI-RS resources, where M represents a positive integer) from a set of CSI-RS resources (e.g., $N_{TRP}$ CSI-RS resources).

In certain aspects, each CSI-RS resource of the set of CSI-RS resources is associated with a CSI-RS resource identification (ID).

In certain aspects, each CSI-RS resource of the set of CSI-RS resources is associated with an individual TRP. For example, a first CSI-RS resource of the set of CSI-RS resources is associated with a first TRP and a second CSI-RS resource of the set of CSI-RS resources is associated with a second TRP.

In certain aspects, a set of TRPs corresponding to the set of CSI-RS resources correspond to a maximum number of TRPs that can participate in a CJT.

In certain aspects, the network entity may transmit a channel measurement resource (CMR) configuration to the UE via a first signaling. The CMR configuration indicates the set of CSI-RS resources. In one example, the first signaling is a radio resource control (RRC) signaling. In another example, the first signaling is a medium access control (MAC-control element (CE) signaling. In another example, the first signaling is a downlink control information (DCI) signaling.

In certain aspects, the network entity may transmit the grouping information to the UE along with the CMR configuration via the first signaling.

In certain aspects, the network entity may separately transmit the grouping information to the UE via a second signaling. In one example, the second signaling is an RRC signaling. In another example, the second signaling is a MAC-CE signaling. In another example, the second signaling is a DCI signaling.

In certain aspects, the at least one group of CSI-RS resources are associated with a group of TRPs. For example, a first group of CSI-RS resources (e.g., 5 CSI-RS resources) are associated with a first group of TRPs (e.g., 5 TRPs) and a second group of CSI-RS resources (e.g., 10 CSI-RS resources) are associated with a second group of TRPs (e.g., 10 TRPs).

In certain aspects, each group of TRPs may be located at a same location. For example, the first group of TRPs may be located at a first location and the second group of TRPs may be located at a second location.

In certain aspects, each group of TRPs may operate together. For example, the first group of TRPs may operate together and the second group of TRPs may operate together.

In certain aspects, each group of TRPs may share a same radio frequency (RF) chain. For example, the first group of TRPs may share a first RF chain and the second group of TRPs may share a second RF chain.

In certain aspects, each group of TRPs may share a same digital port. For example, the first group of TRPs may share a first digital port and the second group of TRPs may share a second digital port.

At 2020, the UE generates a CSI feedback for the at least one group of CSI-RS resources.

In certain aspects, the CSI feedback indicates relative phase information for the at least one group of CSI-RS resources with respect to a reference CSI-RS resource. For example, the CSI feedback indicates the relative phase information for the first group of CSI-RS resources with respect to the reference CSI-RS resource, and the relative phase information for the second group of CSI-RS resources with respect to the reference CSI-RS resource.

In certain aspects, the CSI feedback indicates relative amplitude information for the at least one group of CSI-RS resources with respect to the reference CSI-RS resource. For example, the CSI feedback indicates the relative amplitude information for the first group of CSI-RS resources with respect to the reference CSI-RS resource, and the relative amplitude information for the second group of CSI-RS resources with respect to the reference CSI-RS resource.

At 2030, the UE transmits a CSI report to the network entity. The CSI report indicates the CSI feedback for the at least one group of CSI-RS resources.

In certain aspects, the CMR configuration may indicate a group size n, which may suggest that every n CSI-RS resources in the set of CSI-RS resources are grouped, for example, in an increasing or decreasing order of CSI-RS resource IDs associated with the CSI-RS resources.

In certain aspects, all groups of CSI-RS resources may have a same size (e.g., a number of CSI-RS resources within a group). For example, the first group of CSI-RS resources 25                                                                          26 may have X number of CSI-RS resources and the second group of CSI-RS resources may also have X number of CSI-RS resources.

In certain aspects, the CMR configuration may indicate $\{n_1, n_2, \ldots n_G\}$ such that $\Sigma n_i = N_{TRP}$. In this case, the UE may assume a first $n_1$ CSI-RS resources in the set of CSI-RS resources to form a first group of CSI-RS resources based on an order of CSI-RS resource indicators (CRIs) associated with the CSI-RS resources. Similarly, CSI-RS resources from $n_{1+1}$ to $n_1+n_2$ form a second group of CSI-RS resources, etc.

In certain aspects, different groups of CSI-RS resources may have a different size. For example, the first group of CSI-RS resources may have X number of CSI-RS resources and the second group of CSI-RS resources may have Y number of CSI-RS resources (where a value of Y is different than a value of X). In another example, the first group of CSI-RS resources may have X number of CSI-RS resources, the second group of CSI-RS resources may have Y number of CSI-RS resources, and a third group of CSI-RS resources may also have Y number of CSI-RS resources. In yet another example, the first group of CSI-RS resources may have X number of CSI-RS resources, the second group of CSI-RS resources may have Y number of CSI-RS resources, and the third group of CSI-RS resources may also have X number of CSI-RS resources.

FIG. 21 shows an example of a method 2100 for wireless communications by a UE, such as the UE 104 of FIGS. 1 and 3.

Method 2100 begins at step 2110 with receiving grouping information indicating at least one group of CSI-RS resources from a set of CSI-RS resources. In some cases, the operations of this step refer to, or may be performed by, circuitry for receiving and/or code for receiving as described with reference to FIG. 27.

Method 2100 then proceeds to step 2120 with transmitting a CSI report indicating a CSI feedback for the at least one group of CSI-RS resources where the CSI feedback indicates relative phase information for the at least one group of CSI-RS resources with respect to a reference CSI-RS resource. In some cases, the operations of this step refer to, or may be performed by, circuitry for transmitting and/or code for transmitting as described with reference to FIG. 27.

In certain aspects, each CSI-RS resource of the set of CSI-RS resources is associated with an individual TRP, and a set of TRPs corresponding to the set of CSI-RS resources are a maximum number of TRPs that can participate in a CJT.

In certain aspects, the at least one group of CSI-RS resources are associated with a group of TRPs, and at least one of: the group of TRPs are located at a same location, the group of TRPs operate together, the group of TRPs share a same RF chain, or the group of TRPs share a same digital port.

In certain aspects, the CSI feedback indicates relative amplitude information for the at least one group of CSI-RS resources with respect to a reference CSI-RS resource.

In certain aspects, method 2100 further includes receiving, via a first signaling, a CMR configuration indicating the set of CSI-RS resources, and where the first signaling is an RRC signaling, a MAC-CE signaling, or a DCI signaling.

In certain aspects, the receiving of the grouping information includes receiving the grouping information via the first signaling.

In certain aspects, the receiving of the grouping information includes receiving the grouping information via a second signaling, and the second signaling is an RRC signaling, a MAC-CE signaling, or a DCI signaling.

In certain aspects, the at least one group of CSI-RS resources correspond to multiple groups of CSI-RS resources, and two or more of the multiple groups of CSI-RS resources may have a same size.

In certain aspects, the at least one group of CSI-RS resources correspond to multiple groups of CSI-RS resources, and different groups of the multiple groups of CSI-RS resources may have a different size.

Figure 27:
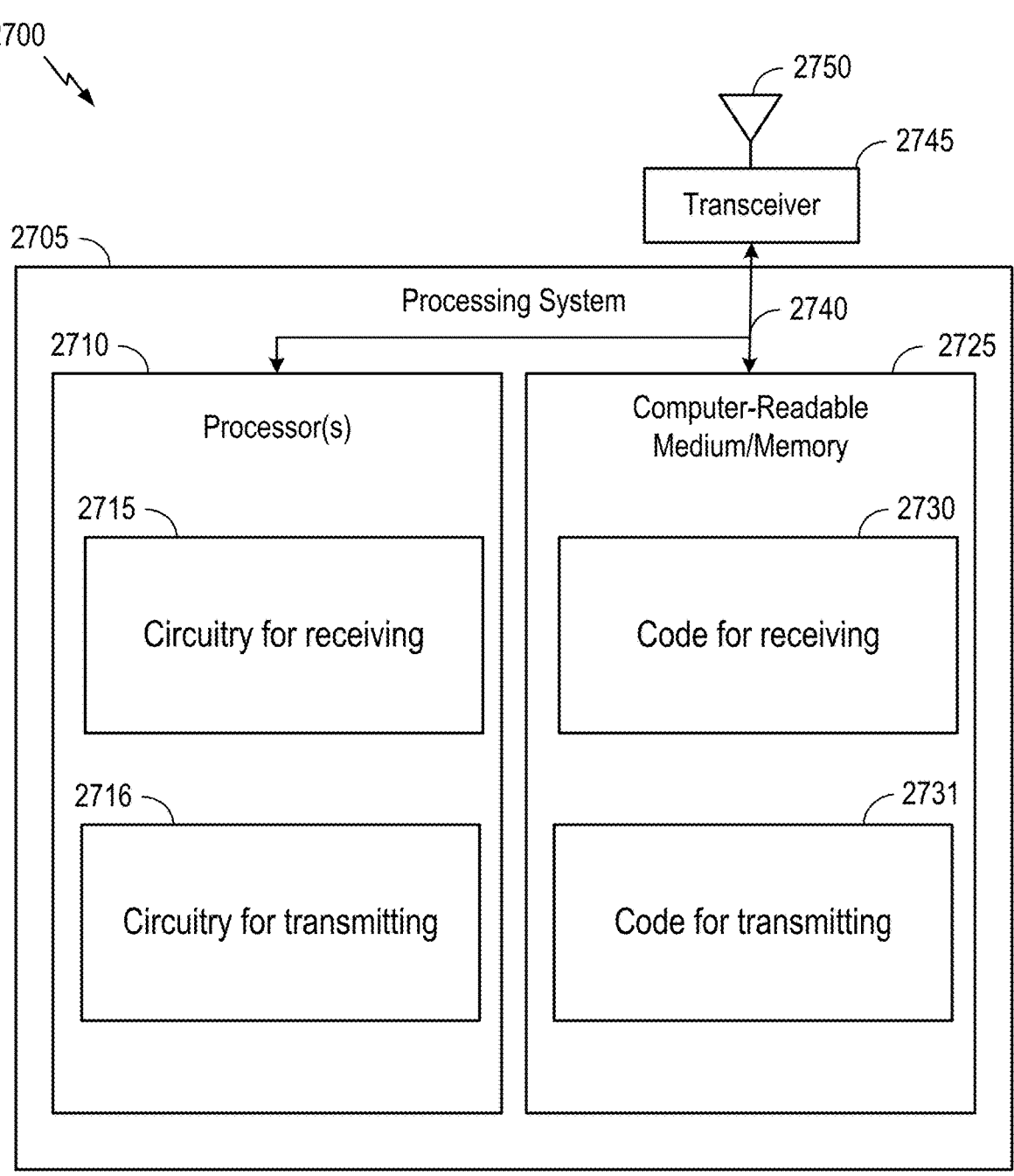
FIGS. 27 and 28 depict aspects of example communications devices.

In one aspect, method 2100, or any aspect related to it, may be performed by an apparatus, such as communications device 2700 of FIG. 27, which includes various components operable, configured, or adapted to perform the method 2100. Communications device 2700 is described below in further detail.

Note that FIG. 21 is just one example of a method, and other methods including fewer, additional, or alternative steps are possible consistent with this disclosure.

FIG. 22 shows an example of a method 2200 for wireless communications by a network entity, such as the BS 102 of FIGS. 1 and 3, or the disaggregated BS as discussed with respect to FIG. 2.

Method 2200 begins at step 2210 with transmitting grouping information indicating at least one group of CSI-RS resources from a set of CSI-RS resources. In some cases, the operations of this step refer to, or may be performed by, circuitry for transmitting and/or code for transmitting as described with reference to FIG. 28.

Method 2200 then proceeds to step 2220 with receiving a CSI report indicating a CSI feedback for the at least one group of CSI-RS resources where the CSI feedback indicates relative phase information for the at least one group of CSI-RS resources with respect to a reference CSI-RS resource. In some cases, the operations of this step refer to, or may be performed by, circuitry for receiving and/or code for receiving as described with reference to FIG. 28.

Figure 28:
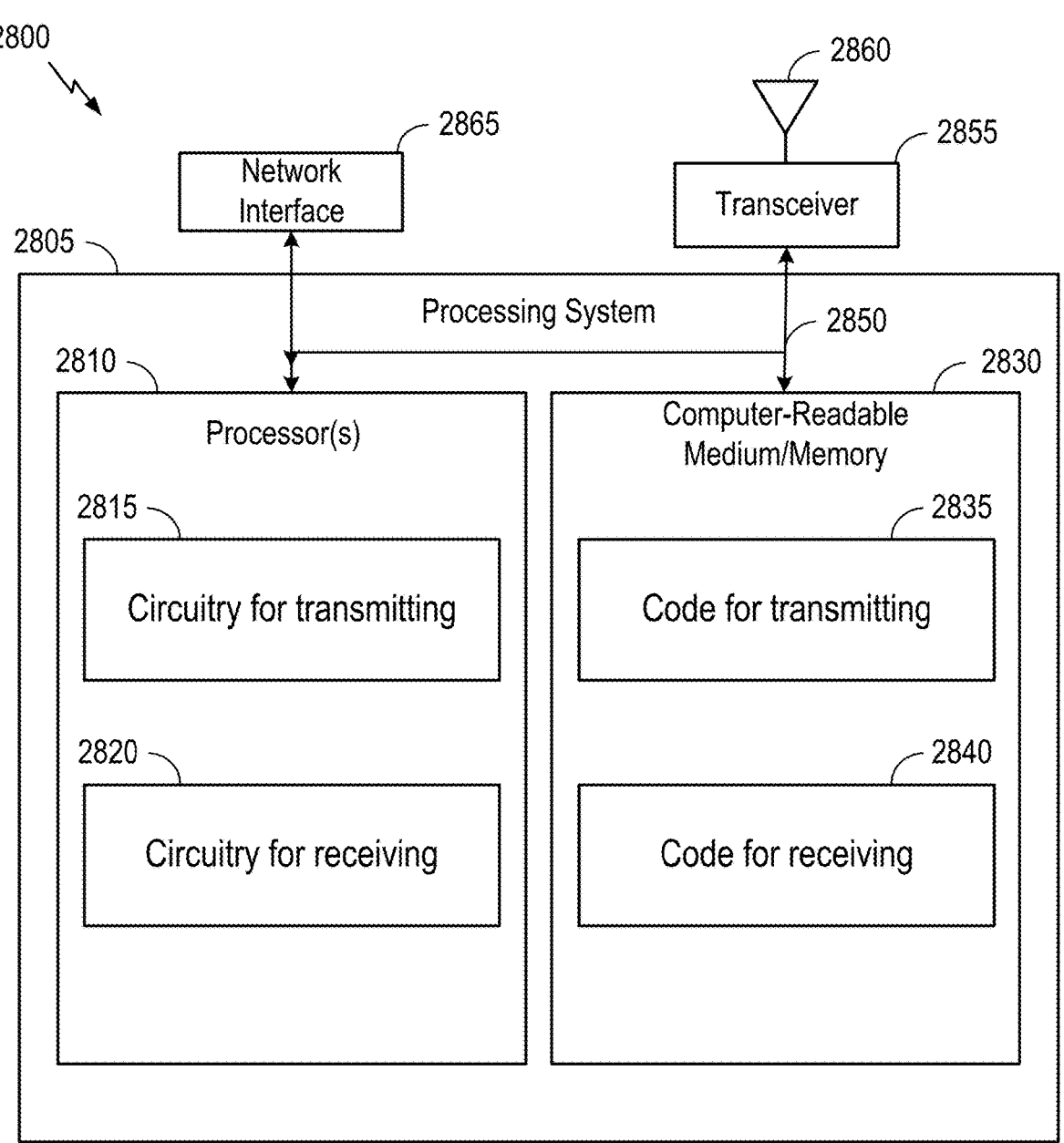

In one aspect, method 2200, or any aspect related to it, may be performed by an apparatus, such as communications device 2800 of FIG. 28, which includes various components operable, configured, or adapted to perform the method 2200. Communications device 2800 is described below in further detail.

Note that FIG. 22 is just one example of a method, and other methods including fewer, additional, or alternative steps are possible consistent with this disclosure.

Figure 23:
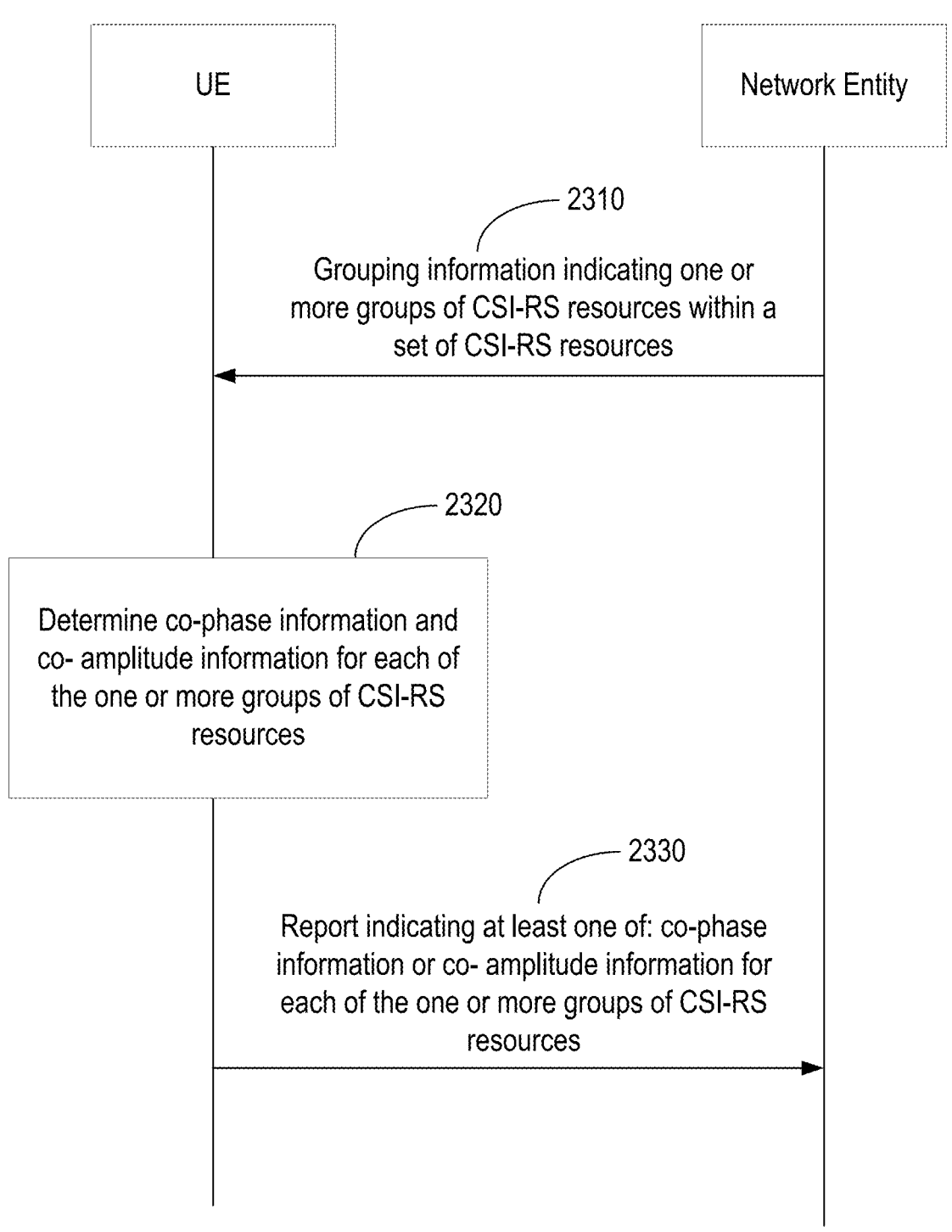
FIG. 23 depicts a call flow diagram illustrating example communication among a UE and a network entity.
Figure 24:
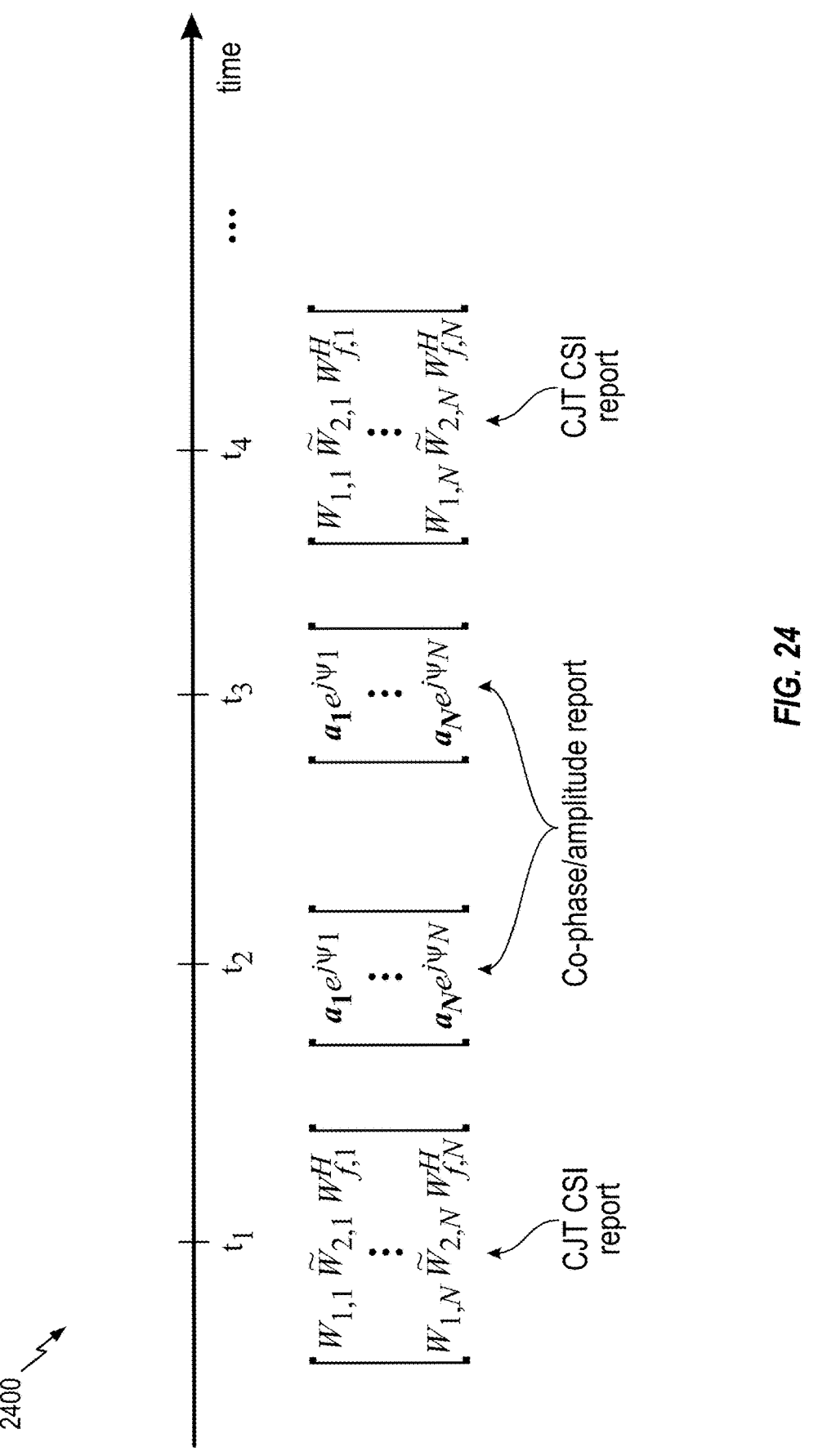
FIG. 24 depicts example CJT CSI reports and a co-phase/amplitude report.

FIG. 23 depicts another call flow diagram illustrating example communication among a UE (e.g., such as the UE 104 depicted and described with respect to FIGS. 1 and 3) and a network entity (e.g., such as the BS 102 depicted and described with respect to FIGS. 1 and 3, or the disaggregated BS depicted and described with respect to FIG. 2).

At 2310, the network entity transmits grouping information to the UE. The grouping information indicates one or more groups of CSI-RS resources (e.g., the M groups of CSI-RS resources depicted and described with respect to FIG. 20) within a set of CSI-RS resources (e.g., the $N_{TRP}$ CSI-RS resources depicted and described with respect to FIG. 20).

At 2320, the UE determines co-phase information and co-amplitude information for each of the one or more groups of CSI-RS resources.

In certain aspects, the co-phase information for each of the one or more groups of CSI-RS resources is with respect to a reference CSI-RS resource.

In certain aspects, the co-phase information for each of the one or more groups of CSI-RS resources is with respect to a reference group of CSI-RS resources.

In certain aspects, the co-amplitude information for each of the one or more groups of CSI-RS resources is with respect to the reference CSI-RS resource.

In certain aspects, the co-amplitude information for each of the one or more groups of CSI-RS resources is with respect to the reference group of CSI-RS resources.

In certain aspects, the network entity may select the reference CSI-RS resource and/or the reference group of CSI-RS resources, and then transmit an indication of the reference CSI-RS resource and/or the reference group of CSI-RS resources to the UE (e.g., along with an enhanced or new CMR configuration).

In certain aspects, the UE may select the reference CSI-RS resource and/or the reference group of CSI-RS resources, and then transmit an indication of the reference CSI-RS resource and/or the reference group of CSI-RS resources to the network entity.

In one example, a first reference CSI-RS resource indicated in a CMR configuration (e.g., the CMR configuration depicted and described with respect to FIG. 20) may be the reference CSI-RS resource, and a first group of CSI-RS resources indicated in the CMR configuration may be the reference group of CSI-RS resources.

In another example, the reference CSI-RS resource may be associated with a highest layer 1 (L1) reference signal received power (RSRP) value.

At 2330, the UE transmits a report to the network entity. The report indicates at least one of the co-phase information or the co-amplitude information for each of the one or more groups of CSI-RS resources.

In certain aspects, the network entity transmits a configuration for the report to the UE. In one example, the configuration indicates a periodicity of the report. In another example, the configuration indicates transmission resources for the report. In such cases, the UE transmits the report to the network entity, in accordance with the configuration for the report.

In certain aspects, the periodicity and/or the transmission resources may be based on a CSI report configuration. The CSI report configuration is for a CSI report (or a CJT CSI report) indicating a CSI feedback for each CSI-RS resource in each of the one or more groups of CSI-RS resources.

In certain aspects, the UE may select a same frequency domain (FD) basis for all CSI-RS resources in a group of CSI-RS resources of the one or more groups of CSI-RS resources. In certain aspects, the UE may select a separate FD basis per indicated TRP group corresponding to a group of CSI-RS resources (e.g., when a first mode is configured).

In certain aspects, a UE is configured to report co-phase information and co-amplitude information (e.g., for each of the one or more groups of CSI-RS resources) in a separate report (e.g., a co-phase/amplitude report) than a CJT CSI report (e.g., indicating a CSI feedback for each CSI-RS resource in each of the one or more groups of CSI-RS resources). In such cases, the UE reports the co-phase information and the co-amplitude information only across different groups of TRPs (e.g., corresponding to different groups of CSI-RS resources) not within a group of TRPs. Examples of the CJT CSI reports and the co-phase/amplitude report are depicted in illustration 2400 of FIG. 24.

FIG. 25 shows an example of a method 2500 for wireless communications by a UE, such as the UE 104 of FIGS. 1 and 3.

Method 2500 begins at step 2510 with receiving grouping information indicating one or more groups of CSI-RS resources within a set of CSI-RS resources. In some cases, the operations of this step refer to, or may be performed by, circuitry for receiving and/or code for receiving as described with reference to FIG. 27.

Method 2500 then proceeds to step 2520 with transmitting a report indicating at least one of: co-phase information or co-amplitude information for each of the one or more groups of CSI-RS resources. In some cases, the operations of this step refer to, or may be performed by, circuitry for transmitting and/or code for transmitting as described with reference to FIG. 27.

In certain aspects, each CSI-RS resource of the set of CSI-RS resources is associated with an individual TRP, and a set of TRPs corresponding to the set of CSI-RS resources are a maximum number of TRPs that can participate in a CJT.

In certain aspects, the co-phase information for each of the one or more groups of CSI-RS resources is with respect to a reference CSI-RS resource or a reference group of CSI-RS resources.

In certain aspects, the co-amplitude information for each of the one or more groups of CSI-RS resources is with respect to a reference CSI-RS resource or a reference group of CSI-RS resources.

In certain aspects, method 2500 further includes receiving an indication of at least one of: the reference CSI-RS resource or the reference group of CSI-RS resources.

In certain aspects, method 2500 further includes transmitting an indication of at least one of: the reference CSI-RS resource or the reference group of CSI-RS resources.

In certain aspects, the reference CSI-RS resource is associated with a highest L1-RSRP value.

In certain aspects, a group of CSI-RS resources within the one or more groups of CSI-RS resources is associated with a group of TRPs; and at least one of: the group of TRPs are located at a same location, the group of TRPs operate together, the group of TRPs share a same RF chain, or the group of TRPs share a same digital port.

In certain aspects, method 2500 further includes receiving a configuration for the report, and wherein the configuration indicates at least one of: a periodicity of the report or transmission resources for the report.

In certain aspects, at least one of the periodicity or the transmission resources is based on a CSI report configuration; and the CSI report configuration is for a CSI report indicating a CSI feedback for each CSI-RS resource in each of the one or more groups of CSI-RS resources.

In certain aspects, method 2500 further includes selecting a same FD basis for all CSI-RS resources in a group of CSI-RS resources.

In one aspect, method 2500, or any aspect related to it, may be performed by an apparatus, such as communications device 2700 of FIG. 27, which includes various components operable, configured, or adapted to perform the method 2500. Communications device 2700 is described below in further detail.

Note that FIG. 25 is just one example of a method, and other methods including fewer, additional, or alternative steps are possible consistent with this disclosure.

FIG. 26 shows an example of a method 2600 for wireless communications by a network entity, such as the BS 102 of FIGS. 1 and 3, or the disaggregated BS as discussed with respect to FIG. 2.

Method 2600 begins at step 2610 with transmitting grouping information indicating one or more groups of CSI-RS resources within a set of CSI-RS resources. In some cases, the operations of this step refer to, or may be performed by, circuitry for transmitting and/or code for transmitting as described with reference to FIG. 28.

Method 2600 then proceeds to step 2620 with receiving a report indicating at least one of: co-phase information or co-amplitude information for each of the one or more groups of CSI-RS resources. In some cases, the operations of this step refer to, or may be performed by, circuitry for receiving and/or code for receiving as described with reference to FIG. 28.

In one aspect, method 2600, or any aspect related to it, may be performed by an apparatus, such as communications device 2800 of FIG. 28, which includes various components operable, configured, or adapted to perform the method 2600. Communications device 2800 is described below in further detail.

Note that FIG. 26 is just one example of a method, and other methods including fewer, additional, or alternative steps are possible consistent with this disclosure.

Communications Devices

FIG. 27 depicts aspects of an example communications device 2700. In some aspects, communications device 2700 is a user equipment (UE), such as UE 104 described above with respect to FIGS. 1 and 3.

The communications device 2700 includes a processing system 2705 coupled to a transceiver 2745 (e.g., a transmitter and/or a receiver). The transceiver 2745 is configured to transmit and receive signals for the communications device 2700 via an antenna 2750, such as the various signals as described herein. The processing system 2705 may be configured to perform processing functions for the communications device 2700, including processing signals received and/or to be transmitted by the communications device 2700.

The processing system 2705 includes one or more processors 2710. In various aspects, the one or more processors 2710 may be representative of one or more of receive processor 358, transmit processor 364, TX MIMO processor 366, and/or controller/processor 380, as described with respect to FIG. 3. The one or more processors 2710 are coupled to a computer-readable medium/memory 2725 via a bus 2740. In certain aspects, the computer-readable medium/memory 2725 is configured to store instructions (e.g., computer-executable code) that when executed by the one or more processors 2710, cause the one or more processors 2710 to perform the method 2100 described with respect to FIG. 21 and/or the method 2500 described with respect to FIG. 25. Note that reference to a processor performing a function of communications device 2700 may include one or more processors 2710 performing that function of communications device 2700.

In the depicted example, computer-readable medium/memory 2725 stores code (e.g., executable instructions), such as code for receiving 2730 and code for transmitting 2731. Processing of the code for receiving 2730 and the code for transmitting 2731 may cause the communications device 2700 to perform the method 2100 described with respect to FIG. 21 and/or the method 2500 described with respect to FIG. 25.

The one or more processors 2710 include circuitry configured to implement (e.g., execute) the code stored in the computer-readable medium/memory 2725, including circuitry such as circuitry for receiving 2715 and circuitry for transmitting 2716. Processing with the circuitry for receiving 2715 and the circuitry for transmitting 2716 may cause the communications device 2700 to perform the method 2100 described with respect to FIG. 21 and/or the method 2500 described with respect to FIG. 25.

Various components of the communications device 2700 may provide means for performing the method 2100 described with respect to FIG. 21 and/or the method 2500 described with respect to FIG. 25. For example, means for transmitting, sending or outputting for transmission may include transceivers 354 and/or antenna(s) 352 of the UE 104 illustrated in FIG. 3 and/or the circuitry for transmitting 2716, the code for transmitting 2731, the transceiver 2745 and the antenna 2750 of the communications device 2700 in FIG. 27. Means for receiving or obtaining may include transceivers 354 and/or antenna(s) 352 of the UE 104 illustrated in FIG. 3 and/or the circuitry for receiving 2715, the code for receiving 2730, the transceiver 2745 and the antenna 2750 of the communications device 2700 in FIG. 27.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. In various aspects, an RF front end may include various components, including transmit and receive processors, transmit and receive MIMO processors, modulators, demodulators, and the like, such as depicted in the examples in FIG. 3.

In some cases, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 3. Notably, FIG. 27 is an example, and many other examples and configurations of communication device 2700 are possible.

FIG. 28 depicts aspects of an example communications device 2800. In some aspects, communications device 2800 is a network entity, such as BS 102 of FIGS. 1 and 3, or a disaggregated BS as discussed with respect to FIG. 2.

The communications device 2800 includes a processing system 2805 coupled to a transceiver 2855 (e.g., a transmitter and/or a receiver) and/or a network interface 2865. The transceiver 2855 is configured to transmit and receive signals for the communications device 2800 via an antenna 2860, such as the various signals as described herein. The network interface 2865 is configured to obtain and send signals for the communications device 2800 via communication link(s), such as a backhaul link, midhaul link, and/or fronthaul link as described herein, such as with respect to FIG. 2. The processing system 2805 may be configured to perform processing functions for the communications device 2800, including processing signals received and/or to be transmitted by the communications device 2800.

The processing system 2805 includes one or more processors 2810. In various aspects, the one or more processors 2810 may be representative of one or more of receive processor 338, transmit processor 320, TX MIMO processor 330, and/or controller/processor 340, as described with respect to FIG. 3. The one or more processors 2810 are coupled to a computer-readable medium/memory 2830 via a bus 2850. In certain aspects, the computer-readable medium/ memory 2830 is configured to store instructions (e.g., computer-executable code) that when executed by the one or more processors 2810, cause the one or more processors 2810 to perform the method 2200 described with respect to FIG. 22 and/or the method 2600 described with respect to FIG. 26. Note that reference to a processor of communications device 2800 performing a function may include the one or more processors 2810 of the communications device 2800 performing that function.

In the depicted example, the computer-readable medium/memory 2830 stores code (e.g., executable instructions), such as code for receiving 2840 and code for transmitting 2835. Processing of the code for receiving 2840 and the code for transmitting 2835 may cause the communications device 2800 to perform the method 2200 described with respect to FIG. 22 and/or the method 2600 described with respect to FIG. 26.

The one or more processors 2810 include circuitry configured to implement (e.g., execute) the code stored in the computer-readable medium/memory 2830, including circuitry such as circuitry for receiving 2820 and circuitry for transmitting 2815. Processing with the circuitry for receiving 2820 and the circuitry for transmitting 2815 may cause the communications device 2800 to perform the method 2200 described with respect to FIG. 22 and/or the method 2600 described with respect to FIG. 26.

Various components of the communications device 2800 may provide means for performing the method 2200 described with respect to FIG. 22 and/or the method 2600 described with respect to FIG. 26. Means for transmitting, sending or outputting for transmission may include transceivers 332 and/or antenna(s) 334 of the BS 102 illustrated in FIG. 3 and/or the circuitry for transmitting 2815, the code for transmitting 2835, the transceiver 2855 and the antenna 2860 of the communications device 2800 in FIG. 28. Means for receiving or obtaining may include transceivers 332 and/or antenna(s) 334 of the BS 102 illustrated in FIG. 3 and/or the circuitry for receiving 2820, the code for receiving 2840, the transceiver 2855 and the antenna 2860 of the communications device 2800 in FIG. 28.

In some cases, rather than actually transmitting, for example, signals and/or data, a device may have an interface to output signals and/or data for transmission (a means for outputting). For example, a processor may output signals and/or data, via a bus interface, to an RF front end for transmission. In various aspects, an RF front end may include various components, including transmit and receive processors, transmit and receive MIMO processors, modulators, demodulators, and the like, such as depicted in the examples in FIG. 3.

In some cases, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 3. Notably, FIG. 28 is an example, and many other examples and configurations of communication device 2800 are possible.

Example Clauses

Implementation examples are described in the following numbered clauses:

Clause 1: A method for wireless communications by a user equipment (UE), comprising: receiving grouping information indicating at least one group of channel state information (CSI) reference signal (RS) resources from a set of CSI-RS resources; and transmitting a CSI report indicating a CSI feedback for the at least one group of CSI-RS resources, wherein the CSI feedback indicates relative phase information for the at least one group of CSI-RS resources with respect to a reference CSI-RS resource.

Clause 2: The method of clause 1, wherein: each CSI-RS resource of the set of CSI-RS resources is associated with an individual transmission reception point (TRP); and a set of TRPs corresponding to the set of CSI-RS resources are a maximum number of TRPs that can participate in a coherent joint transmission (CJT).

Clause 3: The method of any one of clauses 1-2, wherein: the at least one group of CSI-RS resources are associated with a group of transmission reception points (TRPs); and at least one of: the group of TRPs are located at a same location, the group of TRPs operate together, the group of TRPs share a same radio frequency (RF) chain, or the group of TRPs share a same digital port.

Clause 4: The method of any one of clauses 1-3, wherein the CSI feedback indicates relative amplitude information for the at least one group of CSI-RS resources with respect to a reference CSI-RS resource.

Clause 5: The method of any one of clauses 1-4, further comprises receiving, via a first signaling, channel measurement resource (CMR) configuration indicating the set of CSI-RS resources, and wherein the first signaling is a radio resource control (RRC) signaling, a medium access control (MAC)-control element (CE) signaling, or a downlink control information (DCI) signaling.

Clause 6: The method of any one of clauses 1-5, wherein the receiving of the grouping information comprises receiving the grouping information via the first signaling.

Clause 7: The method of any one of clauses 1-6, wherein: the receiving of the grouping information comprises receiving the grouping information via a second signaling; and the second signaling is a radio resource control (RRC) signaling, a medium access control (MAC) control element (CE) signaling, or a downlink control information (DCI) signaling.

Clause 8: The method of any one of clauses 1-7, wherein: the at least one group of CSI-RS resources correspond to multiple groups of CSI-RS resources; and each of the multiple groups of CSI-RS resources has a same size.

Clause 9: The method of any one of clauses 1-8, wherein: the at least one group of CSI-RS resources correspond to multiple groups of CSI-RS resources; and each of the multiple groups of CSI-RS resources has a different size.

Clause 10: A method for wireless communications by a network entity, comprising: transmitting grouping information indicating at least one group of channel state information (CSI) reference signal (RS) resources from a set of CSI-RS resources; and receiving a CSI report indicating a CSI feedback for the at least one group of CSI-RS resources, wherein the CSI feedback indicates relative phase information for the at least one group of CSI-RS resources with respect to a reference CSI-RS resource.

Clause 11: The method of clause 10, wherein: each CSI-RS resource of the set of CSI-RS resources is associated with an individual transmission reception point (TRP); and a set of TRPs corresponding to the set of CSI-RS resources are a maximum number of TRPs that can participate in a coherent joint transmission (CJT).

Clause 12: The method of any one of clauses 10-11, wherein the CSI feedback indicates relative amplitude information for the at least one group of CSI-RS resources with respect to a reference CSI-RS resource.

Clause 13: A method for wireless communications by a user equipment (UE), comprising: receiving grouping information indicating one or more groups of channel state information (CSI) reference signal (RS) resources within a set of CSI-RS resources; and transmitting a report indicating at least one of: co-phase information or co-amplitude information for each of the one or more groups of CSI-RS resources.

Clause 14: The method of clause 13, wherein: each CSI-RS resource of the set of CSI-RS resources is associated with an individual transmission reception point (TRP); and a set of TRPs corresponding to the set of CSI-RS resources are a maximum number of TRPs that can participate in a coherent joint transmission (CJT).

Clause 15: The method of any one of clauses 13-14, wherein the co-phase information for each of the one or more groups of CSI-RS resources is with respect to a reference CSI-RS resource or a reference group of CSI-RS resources.

Clause 16: The method of any one of clauses 13-15, further comprising receiving an indication of at least one of: the reference CSI-RS resource or the reference group of CSI-RS resources.

Clause 17: The method of any one of clauses 13-16, further comprising transmitting an indication of at least one of: the reference CSI-RS resource or the reference group of CSI-RS resources.

Clause 18: The method of any one of clauses 13-17, wherein the reference CSI-RS resource is associated with a highest layer 1 (L1) reference signal received power (RSRP) value.

Clause 19: The method of any one of clauses 13-18, wherein the co-amplitude information for each of the one or more groups of CSI-RS resources is with respect to a reference CSI-RS resource or a reference group of CSI-RS resources.

Clause 20: The method of any one of clauses 13-19, further comprising receiving an indication of at least one of: the reference CSI-RS resource or the reference group of CSI-RS resources.

Clause 21: The method of any one of clauses 13-20, further comprising transmitting an indication of at least one of: the reference CSI-RS resource or the reference group of CSI-RS resources.

Clause 22: The method of any one of clauses 13-21, wherein the reference CSI-RS resource is associated with a highest layer 1 (L1) reference signal received power (RSRP) value.

Clause 23: The method of any one of clauses 13-22, wherein: a group of CSI-RS resources within the one or more groups of CSI-RS resources is associated with a group of transmission reception points (TRPs), and at least one of: the group of TRPs are located at a same location, the group of TRPs operate together, the group of TRPs share a same radio frequency (RF) chain, or the group of TRPs share a same digital port.

Clause 24: The method of any one of clauses 13-23, further comprising receiving a configuration for the report, and wherein the configuration indicates at least one of: a periodicity of the report or transmission resources for the report.

Clause 25: The method of any one of clauses 13-24, wherein: at least one of the periodicity or the transmission resources is based on a CSI report configuration; and the CSI report configuration is for a CSI report indicating a CSI feedback for each CSI-RS resource in each of the one or more groups of CSI-RS resources.

Clause 26: The method of any one of clauses 13-25, further comprising selecting a same frequency domain basis for all CSI-RS resources in a group of CSI-RS resources.

Clause 27: A method for wireless communications by a network entity, comprising: transmitting grouping information indicating one or more groups of channel state information (CSI) reference signal (RS) resources within a set of CSI-RS resources; and receiving a report indicating at least one of: co-phase information or co-amplitude information for each of the one or more groups of CSI-RS resources.

Clause 28: The method of clause 27, wherein: each CSI-RS resource of the set of CSI-RS resources is associated with an individual transmission reception point (TRP); and a set of TRPs corresponding to the set of CSI-RS resources are a maximum number of TRPs that can participate in a coherent joint transmission (CJT).

Clause 29: The method of any one of clauses 27-28, wherein the co-phase information for each of the one or more groups of CSI-RS resources is with respect to a reference CSI-RS resource or a reference group of CSI-RS resources.

Clause 30: The method of any one of clauses 27-29, wherein the reference CSI-RS resource is associated with a highest layer 1 (L1) reference signal received power (RSRP) value.

Clause 31: An apparatus, comprising: a memory comprising executable instructions; and a processor configured to execute the executable instructions and cause the apparatus to perform a method in accordance with any one of Clauses 1-30.

Clause 32: An apparatus, comprising means for performing a method in accordance with any one of Clauses 1-30.

Clause 33: A non-transitory computer-readable medium comprising executable instructions that, when executed by a processor of an apparatus, cause the apparatus to perform a method in accordance with any one of Clauses 1-30.

Clause 34: A computer program product embodied on a computer-readable storage medium comprising code for performing a method in accordance with any one of Clauses 1-30.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A user equipment (UE), comprising:
a memory comprising instructions; and
one or more processors, individually or collectively, configured to execute the instructions to cause the UE to:
 receive grouping information indicating at least one group of channel state information (CSI) reference signal (RS) resources from a set of CSI-RS resources; and
 transmit a CSI report indicating a CSI feedback for the at least one group of CSI-RS resources configured for a coherent joint transmission (CJT), wherein the CSI feedback indicates relative phase information for the at least one group of CSI-RS resources configured for the CJT with respect to a same reference CSI-RS resource.

2. The UE of claim 1, wherein:
each CSI-RS resource of the set of CSI-RS resources is associated with an individual transmission reception point (TRP); and
a set of TRPs corresponding to the set of CSI-RS resources are a maximum number of TRPs that can participate in the CJT.

3. The UE of claim 1, wherein:
the at least one group of CSI-RS resources are associated with a group of transmission reception points (TRPs); and
at least one of: the group of TRPs are located at a same location, the group of TRPs operate together, the group of TRPs share a same radio frequency (RF) chain, or the group of TRPs share a same digital port.

4. The UE of claim 1, wherein the CSI feedback indicates relative amplitude information for the at least one group of CSI-RS resources with respect to a reference CSI-RS resource.

5. The UE of claim 1, wherein the one or more processors, individually or collectively, are configured to execute the instructions to cause the UE to receive, via a first signaling, channel measurement resource (CMR) configuration indicating the set of CSI-RS resources, and wherein the first signaling is a radio resource control (RRC) signaling, a medium access control (MAC)-control element (CE) signaling, or a downlink control information (DCI) signaling.

6. The UE of claim 5, wherein the one or more processors, individually or collectively, are configured to execute the instructions to cause the UE to receive the grouping information via the first signaling.

7. The UE of claim 1, wherein:
the one or more processors, individually or collectively, are configured to execute the instructions to cause the UE to receive the grouping information via a second signaling; and the second signaling is a radio resource control (RRC) signaling, a medium access control (MAC) control element (CE) signaling, or a downlink control information (DCI) signaling.

8. The UE of claim 1, wherein:

the at least one group of CSI-RS resources correspond to multiple groups of CSI-RS resources; and each of the multiple groups of CSI-RS resources has a same size.

9. The UE of claim 1, wherein:

the at least one group of CSI-RS resources correspond to multiple groups of CSI-RS resources; and each of the multiple groups of CSI-RS resources has a different size.

10. A network entity, comprising:

a memory comprising instructions; and one or more processors, individually or collectively, configured to execute the instructions to cause the network entity to:

transmit grouping information indicating at least one group of channel state information (CSI) reference signal (RS) resources from a set of CSI-RS resources; and receive a CSI report indicating a CSI feedback for the at least one group of CSI-RS resources configured for a coherent joint transmission (CJT), wherein the CSI feedback indicates relative phase information for the at least one group of CSI-RS resources configured for the CJT with respect to a same reference CSI-RS resource.

11. The network entity of claim 10, wherein:

each CSI-RS resource of the set of CSI-RS resources is associated with an individual transmission reception point (TRP); and a set of TRPs corresponding to the set of CSI-RS resources are a maximum number of TRPs that can participate in the CJT.

12. The network entity of claim 10, wherein the CSI feedback indicates relative amplitude information for the at least one group of CSI-RS resources with respect to a reference CSI-RS resource.

13. A user equipment (UE), comprising:

a memory comprising instructions; and one or more processors, individually or collectively, configured to execute the instructions to cause the UE to:

receive grouping information indicating one or more groups of channel state information (CSI) reference signal (RS) resources within a set of CSI-RS resources; and transmit a report indicating at least one of: co-phase information or co-amplitude information for each of the one or more groups of CSI-RS resources configured for a coherent joint transmission (CJT) with respect to a same reference CSI-RS resource.

14. The UE of claim 13, wherein:

each CSI-RS resource of the set of CSI-RS resources is associated with an individual transmission reception point (TRP); and a set of TRPs corresponding to the set of CSI-RS resources are a maximum number of TRPs that can participate in the CJT.

15. The UE of claim 13, wherein the one or more processors, individually or collectively, are configured to execute the instructions to cause the UE to receive an indication of the reference CSI-RS resource.

16. The UE of claim 13, wherein the one or more processors, individually or collectively, are configured to execute the instructions to cause the UE to transmit an indication of the reference CSI-RS resource.

17. The UE of claim 13, wherein the reference CSI-RS resource is associated with a layer 1 (L1) reference signal received power (RSRP) value.

18. The UE of claim 13, wherein the co-amplitude information for each of the one or more groups of CSI-RS resources is with respect to the same reference CSI-RS resource.

19. The UE of claim 18, wherein the one or more processors, individually or collectively, are configured to execute the instructions to cause the UE to receive an indication of the reference CSI-RS resource.

20. The UE of claim 18, wherein the one or more processors, individually or collectively, are configured to execute the instructions to cause the UE to transmit an indication of the reference CSI-RS resource.

21. The UE of claim 18, wherein the reference CSI-RS resource is associated with a layer 1 (L1) reference signal received power (RSRP) value.

22. The UE of claim 13, wherein:

a group of CSI-RS resources within the one or more groups of CSI-RS resources is associated with a group of transmission reception points (TRPs), and at least one of: the group of TRPs are located at a same location, the group of TRPs operate together, the group of TRPs share a same radio frequency (RF) chain, or the group of TRPs share a same digital port.

23. The UE of claim 13, wherein the one or more processors, individually or collectively, are configured to execute the instructions to cause the UE to receive a configuration for the report, and wherein the configuration indicates at least one of: a periodicity of the report or transmission resources for the report.

24. The UE of claim 23, wherein:

at least one of the periodicity or the transmission resources is based on a CSI report configuration; and the CSI report configuration is for a CSI report indicating a CSI feedback for each CSI-RS resource in each of the one or more groups of CSI-RS resources.

25. The UE of claim 13, wherein the one or more processors, individually or collectively, are configured to execute the instructions to cause the UE to select a same frequency domain basis for all CSI-RS resources in a group of CSI-RS resources.

26. A network entity, comprising:

a memory comprising instructions; and one or more processors, individually or collectively, configured to execute the instructions to cause the network entity to:

transmit grouping information indicating one or more groups of channel state information (CSI) reference signal (RS) resources within a set of CSI-RS resources; and receive a report indicating at least one of: co-phase information or co-amplitude information for each of the one or more groups of CSI-RS resources configured for a coherent joint transmission (CJT) with respect to a same reference CSI-RS resource.

27. The network entity of claim 26, wherein:

each CSI-RS resource of the set of CSI-RS resources is associated with an individual transmission reception point (TRP); and a set of TRPs corresponding to the set of CSI-RS resources are a maximum number of TRPs that can participate in the CJT.

28. The network entity of claim 26, wherein the reference CSI-RS resource is associated with a layer 1 (L1) reference signal received power (RSRP) value.

\* \* \* \* \*